(12) United States Patent
Winther-Jensen et al.

(10) Patent No.: US 9,938,627 B2
(45) Date of Patent: Apr. 10, 2018

(54) GAS PERMEABLE ELECTRODE AND METHOD OF MANUFACTURE

(71) Applicant: Monash University, Clayton, Victoria (AU)

(72) Inventors: Bjorn Winther-Jensen, Mount Waverley (AU); Douglas MacFarlane, East Brighton (AU); Orawan Winther-Jensen, Mount Waverley (AU)

(73) Assignee: AQUAHYDREX PTY LTD, North Wollongong (AU)

( * ) Notice: Subject to any disclaimer, the term of this patent is extended or adjusted under 35 U.S.C. 154(b) by 511 days.

(21) Appl. No.: 14/407,014

(22) PCT Filed: Jun. 11, 2013

(86) PCT No.: PCT/AU2013/000616
§ 371 (c)(1),
(2) Date: Dec. 10, 2014

(87) PCT Pub. No.: WO2013/185169
PCT Pub. Date: Dec. 19, 2013

(65) Prior Publication Data
US 2015/0129431 A1    May 14, 2015

(30) Foreign Application Priority Data

Jun. 12, 2012 (AU) ............................... 2012902441
Feb. 15, 2013 (AU) ............................... 2013900493

(51) Int. Cl.
*C25B 1/04* (2006.01)
*C25B 9/06* (2006.01)
(Continued)

(52) U.S. Cl.
CPC .................. *C25B 1/04* (2013.01); *C25B 1/06* (2013.01); *C25B 9/06* (2013.01); *C25B 11/035* (2013.01);
(Continued)

(58) Field of Classification Search
CPC .................................... C25B 9/06; C25B 1/04
See application file for complete search history.

(56) References Cited

U.S. PATENT DOCUMENTS 3,410,770 A    11/1968   Buechler
4,042,481 A     8/1977   Kelly
(Continued)

FOREIGN PATENT DOCUMENTS

EP    0 580 072 A1    1/1994
EP    1 985 727 A1    10/2008
(Continued)

OTHER PUBLICATIONS

Winther-Jensen et al. ("Toward hydrogen production using a breathable electrode structure to directly separate gases in the water splitting reaction," Elsevier Ltd., International Journal of Hydrogen Energy 37 (2012), pp. 8185-8189).*

(Continued)

*Primary Examiner* — Nicholas A Smith
(74) *Attorney, Agent, or Firm* — Haynes and Boone, LLP

(57) ABSTRACT

A gas permeable or breathable electrode and method of manufacture thereof. In one example there is an electrolytic cell having an electrode comprising a porous material, wherein gas produced at the electrode diffuses out of the cell via the porous material. In operation the gas is produced at the at least one electrode without substantial bubble formation. In another example there is an electrode having a porous conducting material with a hydrophobic layer or coating applied to a side of the porous conducting material.

(Continued)

A catalyst may be applied to another side. The gas permeable or breathable electrode can be used in an electrolytic cell, electrochemical cell, battery and/or fuel cell. Gas produced at the electrode diffuses out of a cell via at least part of the electrode, separating the gas from the reaction at the electrode.

31 Claims, 8 Drawing Sheets

(51) Int. Cl.
```
C25B 11/03      (2006.01)
C25B 1/06       (2006.01)
H01M 4/86       (2006.01)
H01M 12/06      (2006.01)
H01M 12/08      (2006.01)
H01M 8/0232     (2016.01)
H01M 8/0234     (2016.01)
```

(52) U.S. Cl.
CPC ......... *H01M 4/8605* (2013.01); *H01M 12/06* (2013.01); *H01M 12/08* (2013.01); *H01M 8/0232* (2013.01); *H01M 8/0234* (2013.01); *Y02E 60/128* (2013.01); *Y02E 60/366* (2013.01); *Y02P 70/56* (2015.11)

(56) References Cited

U.S. PATENT DOCUMENTS

| | | | |
|---|---|---|---|
| 4,086,155 | A | 4/1978 | Jonville |
| 4,720,331 | A | 1/1988 | Billings |
| 5,395,501 | A | 3/1995 | Rohrbacker et al. |
| 5,423,967 | A | 6/1995 | Keiji |
| 6,127,061 | A | 10/2000 | You-Keung |
| 7,651,602 | B2 | 1/2010 | Helmke |
| 2004/0040838 | A1 | 3/2004 | Helmke et al. |
| 2005/0126924 | A1 | 6/2005 | Gomez |
| 2007/0080069 | A1* | 4/2007 | Melosi ............... C25B 1/12 205/338 |
| 2008/0264780 | A1 | 10/2008 | Masaaki |
| 2009/0078568 | A1 | 3/2009 | Ramaswami |
| 2009/0152118 | A1 | 6/2009 | Sugimasa et al. |
| 2010/0219077 | A1 | 9/2010 | Sohn |
| 2013/0313126 | A1* | 11/2013 | Raatschen ............ C25B 1/04 205/350 |

FOREIGN PATENT DOCUMENTS

| | | | | |
|---|---|---|---|---|
| EP | 1 337 690 | | 4/2011 | |
| WO | WO 2000/034184 | | 6/2000 | |
| WO | WO 00/44057 | | 7/2000 | |
| WO | WO 2001/085635 | | 11/2001 | |
| WO | WO 2008/036962 A2 | | 3/2008 | |
| WO | WO 2012023535 A1 * | | 2/2012 | ............... C25B 1/04 |
| WO | WO 2013/185163 | | 12/2013 | |

OTHER PUBLICATIONS

Chaparro et al., Study of electrochemical instabilities of PEMFC electrodes in aqueous solution by means of membrane inlet mass spectrometry, Journal of Electroanalytical Chemistry 591 (2006), pp. 69-73.

Ioroi et al., Influence of PTFE coating on gas diffusion backing for unitized regenerative polymer electrolyte membrane fuel cells, Journal of Power Sources 124 (2003), pp. 385-389.

Jang et al., Effect of water electrolysis catalysts on carbon corrosion in polymer electrolyte membrane fuel cells, J. Am. Chem. Soc. (2010), 132, 14700-701.

Jiang et al., A planar microfabricated electrolyzer for hydrogen and oxygen generation, Journal of Power Sources 188 (2009), pp. 256-260.

Kato et al., Highly efficient water splitting into H2 and 02 over lanthanum-. Doped NaTa0 photocatalysts with high crystallinity and surface nanostructure, J. Am. Chem. Soc. (2003), 125, 3082-3089.

Kudo et al., Heterogeneous photocatalyst materials for water splitting, Chem. Soc. Rev., 2009, 38, pp. 253-278.

Marangio et al., Concept of a high pressure PEM electrolyser prototype, International Journal of Hydrogen Energy 36 (2011), pp. 7807-7815.

Marini et al., Advanced alkaline water electrolysis, Electrochimica Acta 82 (2012), pp. 384-391.

Mohapatra et al., Design of a highly efficient photoelectric cell for hydrogen generation by water splitting: application of Ti02-xCx nanotubes as a photoanode and Pt/Ti02 nanotubes as a cathode, J. Phys. Chem. C2007, 111, pp. 8677-8685.

Neiminen et al., Comparative performance analysis of PEM and solid oxide steam electrolysers, nternational Journal of Hydrogen Energy 35 (2010), pp. 10842-10850.

Osterloh, Inorganic materials as catalysts for photochemical splitting of water, Chem. Mater. 2008, 20, pp. 35-54.

Pletcher et al., Prospects of alkaline zero gap water electrolysers for hydrogen production,International Journal of Hydrogen Energy 36 (2011), pp. 15089-15104.

Tributsch, Photovoltaic hydrogen generation, International Journal of Hydrogen Energy 33 (2008), pp. 5911-5930.

Winther-Jensen et al., High rates of oxygen reduction over a vapor phase-polymerized PEDOT electrode, Science 2008; 321:671-4.

Winther-Jensen et al., Towards hydrogen production using a breathable electrode structure to directly separate gases in the water splitting reaction, International Journal of Hydrogen Energy 37 (2012) pp. 8185-8189.

Yin et al., Enhanced solar water-splitting efficiency using core/sheath heterostructure CdS/Ti02 nanotube arrays. Nanotechnology 18 (2007) 495608, pp. 1-6.

Zeng et al., Recent progress in alkaline water electrolysis for hydrogen production and applications. Progress in Energy and Combustion Science 36 (2010), pp. 307-326.

International Search Report and Written Opinion of the ISA/AU for PCT/AU2013/000616 dated Jul. 10, 2013, 11 pages.

Search Report issued in European Application No. EP 16184214 dated Oct. 26, 2016 (7 pages).

Office Action issued by the Mexican Patent Office regarding related Mexican Patent Application No. MX/E/2017/048895, dated Oct. 16, 2017, 3 pages.

U.S. Patent Office, Office Action dated Oct. 27, 2017 I U.S. Appl. No. 14/406,797, 9 pages.

\* cited by examiner

GAS PERMEABLE ELECTRODE AND METHOD OF MANUFACTURE

CROSS-REFERENCE TO RELATED APPLICATIONS

This application is a United States national phase of co-pending international patent application No. PCT/AU2013/000616, filed Jun. 11, 2013, which claims priority to Australian patent application No. 2013900493, filed Feb. 15, 2013, and Australian patent application No. 2012902441, filed Jun. 12, 2012, the entire disclosures of which are hereby incorporated herein by reference.

TECHNICAL FIELD

The present invention relates to the field of electrochemistry, particularly electrodes and electrolytic reactions. In particular examples, embodiments of the present invention relate to electrodes, batteries, fuel cells, electrochemical cells and/or other related cell types or structures. Specific example applications include metal-air batteries, particularly reversible metal-air batteries, flow-air batteries, battery systems utilising a reversible air electrode, particularly reversible polymer-air batteries, water splitting devices or cells, and gas producing or gas synthesis devices or cells. In other examples, the present invention relates to devices and methods for separating gases in electrolytic reactions, including for example water splitting. In other examples, the present invention relates to methods of manufacturing electrodes and/or electrochemical cells incorporating the electrodes.

BACKGROUND

Considering a specific electrolytic reaction, discussed by way of example only, the overall reaction of water splitting, $2H_2O \rightarrow 2H_2+O_2$, produces $O_2$ and $H_2$ gases as end products. Water splitting is one of the simplest ways to produce high purity hydrogen. Although the current efficiency of water electrolysis lies in the range of 50-70%, the current cost of hydrogen gas produced by this method is in the range of about $20-30/GJ (assuming $0.05/kWh), compared to about $6-12/GJ for hydrogen gas produced via natural gas reforming and coal gasification.

For water splitting, and many other reactions, gases need to be kept separate for later individual use and to avoid production of an explosive gas mixture. There are several approaches to the design of devices that can maintain separation of two or more gases during electrolysis, for example the use of a membrane to separate electrode compartments or chambers. This also minimizes cross-over of dissolved gases from one electrode to be recycled at another electrode.

Although gases can be separated, new issues arise with these technologies, e.g. cost, mechanical properties, high resistance through the membrane, and in the case of water splitting ultra pure water is needed for proper operation.

As another example, alkaline zero gap electrolysers using $OH^-$ conducting membranes are also being considered. In a traditional alkaline electrolyser, where a diaphragm is the only separator, bubble formation inside and between the electrode and the separator is the major cause of transport resistance. A number of suggestions on bubble management have been made, e.g. use of mechanical circulation of the electrolyte and use of (stable) additives to reduce surface tension of the electrolyte so bubbles can more easily leave the system.

By way of example in relation to water splitting, one of the features of the $O_2$ evolution reaction is that the dissolved oxygen concentration at the electrode has to build up to a level sufficient to nucleate and form small, high-pressure bubbles. According to Laplace's equation: $P=2\gamma/r$, where P is pressure in the bubble, $\gamma$ is the surface tension and r the radius of the bubble, near the surface of an electrolyte, $O_2$ bubbles with 0.1 μm radius need to have a pressure of 14 atm at 25° C. The concentrations required not only produce overpotential at the electrode, but also represent a very reactive environment that challenges the long term stability of many catalysts for water splitting, as well as for other electrolytic reactions.

Reports have described efforts to improve cell efficiency, such as for water splitting, by addition of sacrificial agents or co-catalysts, modification of catalyst crystal structures and morphology, and specific surface area. Also, there have been attempts to separate gases using different flow streams of the electrolyte in a planar microfabricated device, but the device efficiency was not high.

Improved removal of gases, such as $O_2$ and $H_2$, from a cell before bubbles are formed has not yet been suitably or sufficiently addressed. Traditional gas diffusion electrodes (GDE) of the type used in fuel cells have a tendency to continue to form $O_2$ bubbles, for example when operating as water splitting devices. Moreover, these electrodes are not stable under water oxidation (WO) conditions, with carbon being rapidly oxidized at the potentials involved in water oxidation.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates. It is to be appreciated that any discussion of documents, devices, acts or knowledge in this specification is included to explain the context of the present invention.

SUMMARY

This Summary is provided to introduce a selection of concepts in a simplified form that are further described below in the Examples. This Summary is not intended to identify key features or essential features of the claimed subject matter, nor is it intended to be used to limit the scope of the claimed subject matter.

In one form, there is provided a device, method and/or process utilising an electrode including a material, which may be a type of membrane or barrier, used to directly separate evolved or produced gases from an electrolyte solution. Advantageously, this improves the efficiency of electrolytic reactions used for gas production or synthesis.

In another form, there is provided a gas permeable or breathable electrode, for example for use in an electrolytic cell, electrochemical cell, battery and/or fuel cell. In other forms, there is provided a method of manufacturing an electrode and/or cells or batteries incorporating the electrode.

In other forms, there is provided a cell or battery including at least one porous electrode, for example a gas permeable, i.e. breathable, electrode having improved economic efficiency, and/or an improved method of manufacturing a porous, gas permeable or breathable electrode.

Reference to a porous, gas permeable or breathable electrode means that at least part of the electrode is sufficiently porous or permeable to allow movement, transfer or transport of one or more gases across and/or through at least part of the electrode.

Reference to a porous conducting material should be read as a general reference to any form or type of porous conducting medium, article, layer, membrane, barrier, matrix, element or structure, or combination thereof.

In particular example aspects, embodiments are suitable for use in metal-air batteries, particularly reversible metal-air batteries. In other particular example aspects, embodiments are suitable for use in flow-air batteries. In other particular example aspects, embodiments are suitable for use in battery systems utilising a reversible air electrode, particularly reversible polymer-air batteries.

In other particular example aspects, embodiments are suitable for use in gas producing synthesis. In other particular example aspects, embodiments are suitable for use in a water splitting cell or device. In another particular example aspect, there is provided a method for directly separating gases in an electrolytic reaction (for example nitrous oxide production, ammonia production, water splitting, etc.).

It will be convenient to hereinafter describe embodiments of the invention in relation to electrolytic, electrochemical or fuel cells or batteries and gas synthesis, however it should be appreciated that the present invention is not so limited and can be applied to a wide range of other uses.

In one form there is provided an electrolytic cell having at least one electrode comprising a porous material, wherein gas produced at the at least one electrode diffuses out of the cell via the porous material. Preferably, in operation the gas is produced at the at least one electrode without bubble formation or without substantial bubble formation.

In various examples: greater than 90% of the gas produced at the at least one electrode is removed from the cell across or through the porous material; greater than 95% of the gas produced at the at least one electrode is removed from the cell across or through the porous material; or greater than 99% of the gas produced at the at least one electrode is removed from the cell across or through the porous material.

In various other example aspects: the porous material is electrolyte impermeable; the gas produced forms bubbles less than 125 µm in average diameter; the gas produced forms bubbles less than 100 µm in average diameter; or the gas produced forms bubbles less than 50 µm in average diameter.

In still various other example aspects: the at least one electrode is a cathode, and wherein in operation the gas produced at the cathode diffuses out of the cell via the porous material, separating the gas from a cathodic reaction without substantial bubble formation; and/or the at least one electrode is an anode, and wherein in operation the gas produced at the anode diffuses out of the cell via the porous material, separating the gas from an anodic reaction without substantial bubble formation.

In yet other example aspects: the porous material is at least partly hydrophobic; the porous material includes or has a thin-film layer or coating applied or otherwise associated with the material; and/or the thin-film layer or coating is hydrophobic.

In other specific example aspects, the thin-film layer or coating is selected from the group comprising silicone-fluoropolymer, polydimethylsiloxane (PDMS) or its copolymers with fluoromonomers, PDD-TFE (perfluoro-2,2-dimethyl-1,3-dioxole with tetrafluoroethylene), polyvinyl fluoride, polyvinyl chloride, nylon 8,8, nylon 9,9, polystyrene, polyvinylidene fluoride, poly n-butyl methacrylates, polytrifluoroethylene, nylon 10,10, polybutadiene, polyethylene polychlorotrifluoroethylene, polypropylene, polydimethylsiloxane, poly t-butyl methacrylates, fluorinated ethylene propylene, hexatriacontane, paraffin, polytetrafluoroethylene, poly(hexafluoropropylene), polyisobutylene or combinations thereof.

In still other example aspects: the porous material has an average pore size of less than 0.5 µm; the porous material has an average pore size of less than 0.1 µm; or the porous material has an average pore size of less than 0.05 µm.

In other example aspects: a catalyst is associated with the porous material; and/or the catalyst is selected from the group comprising Pt, Au, Pd, Ru, Ir, Mn, Fe, Ni, Co, $NiO_x$, Mn complexes, Fe complexes, $MoS_x$, CdS, CdSe, and GaAs or combinations thereof.

In other example aspects the electrolytic cell is for use in: gas synthesis; a battery; a fuel cell; the production of nitrous oxide; and/or the production of ammonia.

In another form there is provided an electrolytic cell, comprising: a cathode comprising a first porous material; an anode comprising a second porous material; at least one electrolyte for at least partial immersion of the cathode and the anode; wherein in operation gases are produced at the cathode and the anode without substantial bubble formation and the gases diffuse out of the cell via the porous materials.

In another form there is provided a method of producing gas using an electrolytic cell, the method comprising the steps of providing a cathode comprising a first porous material; providing an anode comprising a second porous material; at least partially immersing the cathode and the anode in at least one electrolyte; and passing a current through the anode and the cathode; wherein gas produced at the anode diffuses out of the cell via the second porous material, and wherein gas produced at the cathode diffuses out of the cell via the first porous material.

In another form there is provided a method of producing gas using an electrolytic cell, the method comprising: producing gas at an electrode; diffusing the gas out of the cell via a porous material of the electrode; and separating the gas produced without substantial bubble formation at the electrode.

In another form there is provided a method of manufacturing a gas permeable electrode, comprising the steps of: providing a porous conducting material; and associating or applying a hydrophobic layer to a first side of the porous conducting material. The method may further include the step of pre-treating a surface of the porous conducting material to remove oxide prior to associating or applying the hydrophobic layer or coating. The method may further include the step of applying a catalyst to a second side of the porous conducting material. Preferably, it should be ensured that the hydrophobic layer or coating does not cover or overlay the second side of the porous conducting material.

In another form there is provided a gas permeable electrode comprising: a porous conducting material; and a hydrophobic layer.

In various example aspects: the hydrophobic layer is a coating on at least part of a first side of the porous conducting material; a catalyst applied to at least a portion of the porous conducting material; and/or the catalyst is applied to at least part of a second side of the porous conducting material.

In other example aspects: the porous conducting material is gas permeable and electrolyte impermeable; and/or the hydrophobic layer does not cover or overlay the second side of the porous conducting material.

The porous conducting material can be at least partially formed of a material selected from the group consisting of conducting carbon, carbon fibre, non-woven carbon fibre, carbon nanotube felt, graphene and carbon nanotubules. Alternatively, the porous conducting material can be at least partially formed of a material selected from the group consisting of Ni, Ti, Cr, Cu, Au or Ag. Optionally, the porous conductive material is formed of a conductive material coated onto fibres, strands or fabric, which are then woven to form the porous conducting material.

In another form there is provided a method of manufacturing a gas permeable electrode, comprising the steps of: providing a porous conducting material; and associating a hydrophobic layer with the porous conducting material. In one example, the hydrophobic layer is applied as a coating to at least part of a first side of the porous conducting material.

In another form there is provided an electrolytic cell comprising: at least one gas permeable electrode comprising a porous conducting material and a hydrophobic layer associated with, or provided on or attached to, at least part of a first side of the porous conducting material; and an electrolyte; wherein, the first side of the porous conducting material faces away from the electrolyte, and in operation, gas is produced at the at least one gas permeable electrode without substantial bubble formation and diffuses out of the cell via the at least one gas permeable electrode.

In one example, in operation the electrolytic cell is used for reduction of $N_2$, $2NO_2^-$ or $CO_2$; or oxidation of a halide, $H_2O_2$ or $NO_2^-$. In another example, the electrolytic cell is for use in a battery or fuel cell.

In another example, the electrolytic cell is a water splitting cell and the electrolyte is at least partially water. In this example, the at least one gas permeable electrode can be the cathode, and in operation $H_2$ gas is produced at the cathode and diffuses out of the cell via the porous conductive material without substantial bubble formation. Also in this example, the at least one gas permeable electrode can be the anode, and in operation $O_2$ gas is produced at the anode and diffuses out of the cell via the porous conductive material without substantial bubble formation.

Preferably, in use the method includes immersing the at least one gas permeable electrode in the electrolyte and passing a current through the at least one gas permeable electrode.

In one aspect, there is provided an electrolytic cell having at least one electrode comprising a porous material or barrier, wherein gas produced at the electrode diffuses out of the cell via at least part of the electrode (i.e. via the porous material or barrier component of the electrode), separating the gas from the reaction at the electrode without bubble formation, or without substantial bubble formation. The removal of produced gas across, via or through the electrode, or porous material or barrier, results in a device or cell capable of separating the gas from the reaction at the electrode. Note that the porous material or barrier may also be a porous gas permeable, i.e. breathable, material, membrane or barrier, if the appropriate phase interface is established. Advantageously, in at least some examples, greater than 90% of the gas produced at the at least one electrode can be removed from the cell across or through the porous material or barrier. In other examples, greater than 95% and greater than 99% of the gas produced can be removed across or through the porous material or barrier.

The removal of one or more gases from the reaction, or reactions, at or via the electrode without substantial bubble formation permits an electrolytic reaction, such as the water splitting reaction, to be achieved with a substantially lower overpotential, thereby increasing the efficiency of the electrolytic cell, e.g. a water splitting cell.

By the term "without substantial bubble formation" it will be understood that we mean without substantial formation of bubbles visible to the naked eye. All bubbles are "formed" very small and then grow as this is the preferred state because it lowers the pressure in the bubble (according to Laplace's equation: $P=2\gamma/r$, where P is pressure in the bubble, $\gamma$ is the surface tension and r the radius of the bubble). Small bubbles can easily fuse to form bigger ones, thus leading to a range of bubble sizes.

For the example of a water splitting cell, an example cell is capable of operating without the substantial formation of gas bubbles greater than 125 μm in average diameter. In some embodiments, the water splitting cell is capable of operating without the substantial formation of bubbles greater than 100 μm in average diameter, and without the formation of bubbles greater than 50 μm in average diameter. The water splitting cell may, in some embodiments, permit operation without the formation of gas bubbles or at least visible gas bubbles.

Separating the gas from the active area of the electrode without substantial bubble formation facilitates the efficient operation of an electrolytic cell, such as a water splitting cell.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure will become apparent to those skilled in the art.

BRIEF DESCRIPTION OF THE FIGURES

Further disclosure, advantages and aspects of preferred and other example embodiments should be better understood by those skilled in the relevant art by reference to the following description of example embodiments taken in conjunction with the accompanying figures, which are given by way of illustration only, and thus are not limitative of the disclosure herein.

FIG. 1b illustrates gas and ion movements in an aqueous electrolyte corresponding to the example cell shown in FIG. 1a.

40, polypropylene (PP) mesh 41 and non-woven polypropylene (PP) 42). A current of 10 mA was applied at time 45.

Figure 6:
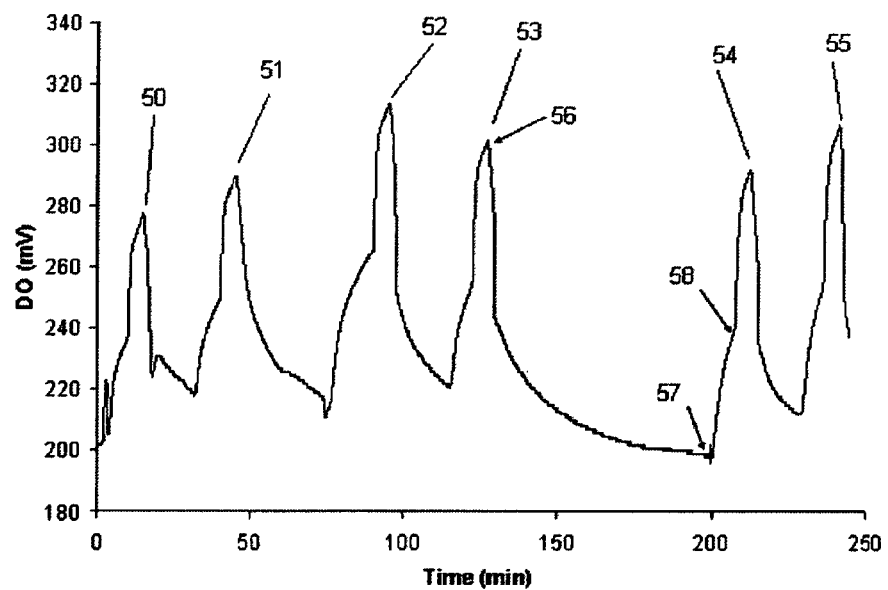

FIG. 6 shows a plot of DO (mV) against time (min) illustrating $O_2$ evolution in the back chamber during shining of light and during evacuation using an example CdS/Ti/Au/Goretex electrode. The peaks appearing in the graph correspond to 13 min ΔDO 42 mV (peak 50), 13 min ΔDO 40 mV (peak 51), 18 min ΔDO 49 mV (peak 52), 12 min ΔDO 47 mV (peak 53), 12 min ΔDO 52 mV (peak 54) and 12 min ΔDO 53 mV (peak 55). Measurements were taken with light off and $N_2$ and $O_2$ admitted to the chamber (peak 56), with the light on and $N_2$ out (peak 57) then $O_2$ out (peak 58).

Figure 7:
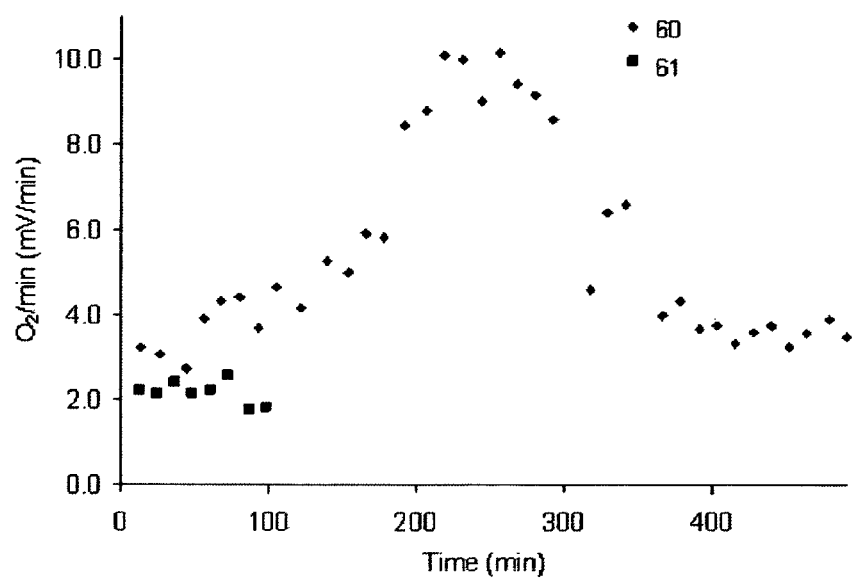

FIG. 7 shows a plot of $O_2$ evolution rate over light exposed time (min) for an example CdS/Ti/Au/Goretex electrode (data points 60) and an example Ti/Au/Gortex electrode (data points 61).

Figure 8:
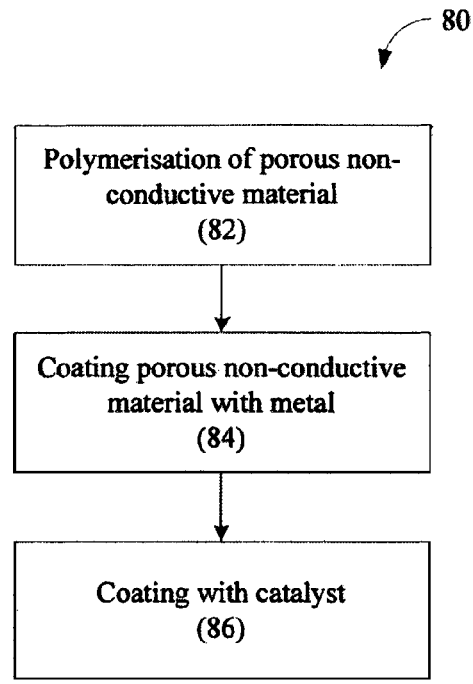

FIG. 8 illustrates an example method for manufacturing an electrode based on a porous non-conductive material.

Figure 9:
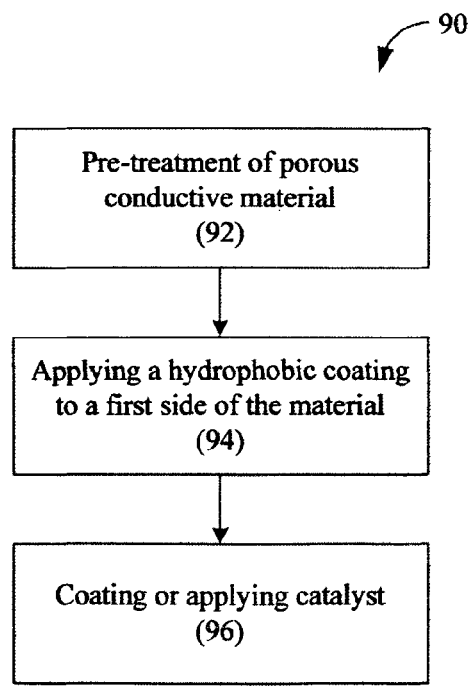

FIG. 9 illustrates an example method for manufacturing an electrode based on a porous conductive material.

Figure 10:
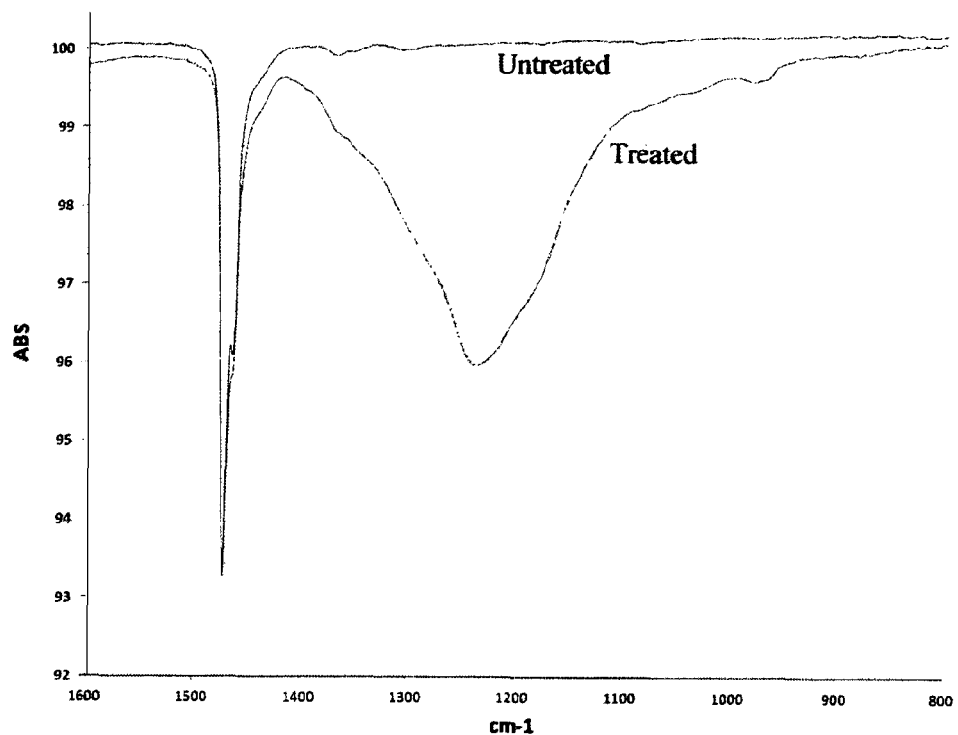

FIG. 10 shows a trace from a Fourier Transform Infra-Red (FTIR) spectrometer illustrating the characteristics of an example porous conductive material before and after coating with poly-perfluoro(methyldecalin).

Figure 11:
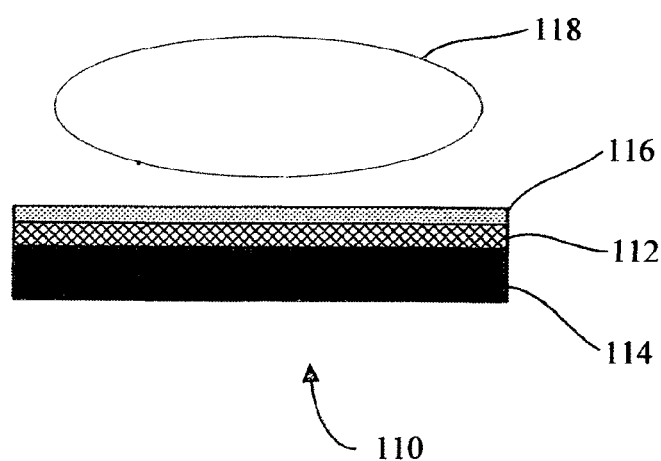

FIG. 11 illustrates a cross-sectional view of an example breathable electrode formed from a porous conducting material or barrier.

Figure 12:
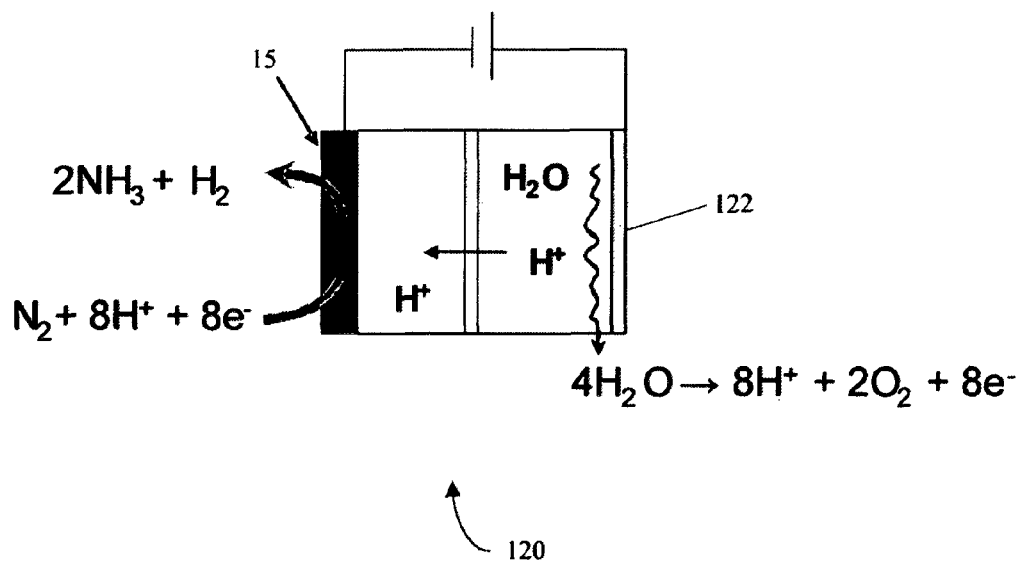

FIG. 12 illustrates an example cell/device for the production of ammonia using a porous material as part of the cathode.

Figure 13:
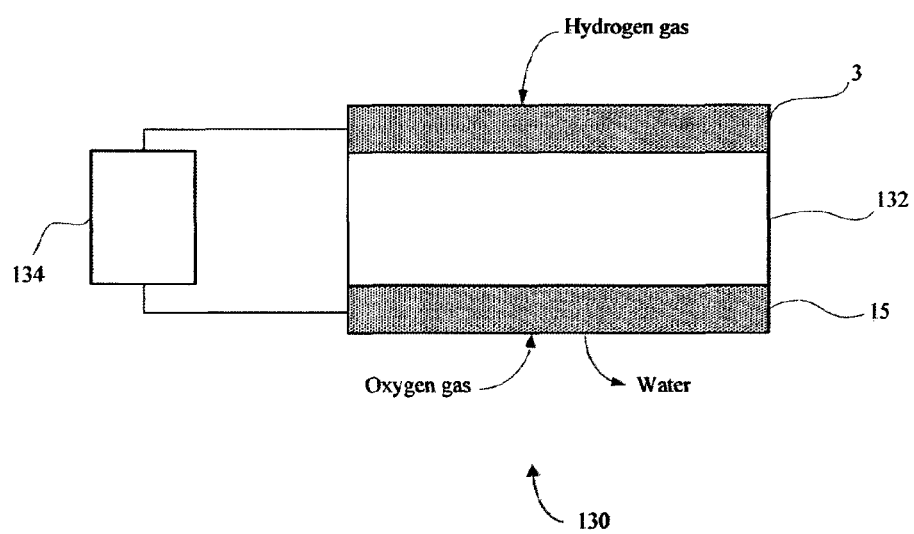

FIG. 13 illustrates an example fuel cell having a porous material as part of the cathode and/or anode.

EXAMPLES

The following modes, features or aspects, given by way of example only, are described in order to provide a more precise understanding of the subject matter of a preferred embodiment or embodiments.

In one example there is provided an electrolytic cell having a cathode comprising a porous or gas permeable material or barrier, wherein a first gas produced at the cathode diffuses out of the cell, via the porous material or barrier, separating the first gas from the cathode without bubble formation or without substantial bubble formation. In another example there is provided an electrolytic cell having an anode comprising a porous or gas permeable material or barrier, wherein a second gas produced at the anode diffuses out of the cell via the porous material or barrier, separating the second gas from the anode without bubble formation or without substantial bubble formation. The cathode and anode discussed above can be provided together in the same cell. Preferably, the porous conducting material or barrier is gas permeable and electrolyte impermeable.

In another example an electrolytic cell has a cathode comprising a first porous or gas permeable material or bather, an anode comprising a second porous or gas permeable material or barrier, and at least one electrolyte for immersion of the anode and the cathode, wherein gas is produced at the electrodes without substantial bubble formation and diffuses out of the cell via the porous or gas permeable materials or barriers.

In another example an electrode for an electrolytic cell comprises a porous or gas permeable material or barrier associated with a model catalyst. The catalyst may be chosen from known catalysts according to the reaction occurring on the electrode. Generally precious metals such as platinum, gold and palladium can be used or other well known rare elements such as Ru and Ir complexes, Mn complexes and abundant metals complexes such as Fe, $NiO_x$ and Co. For increased stability, such metal-oxide catalysts may contain an additional element such as phosphorous. Conducting polymers such as poly(3,4-ethylenedioxythiophene) and polypyrrole, Co, Ni, Fe complexes and $MoS_x$ are also possible catalysts. The choice of catalyst depends on operating conditions such as temperature, salinity and pH of the electrolyte.

In another example the electrolytic cell is a synthesis cell. In another example the cell forms part of a battery, such as a flow-air battery or a metal-air battery, particularly a reversible metal-air battery. In another example the electrolytic cell is used in a reversible air electrode battery system, such as a reversible polymer air battery. In another example the electrolytic cell is a water splitting cell.

In another example the porous or gas permeable material or barrier includes a non-conducting material or structure, for example a non-conducting polymer such as polytetrafluoroethylene (PTFE), polyethylene (PE) or polypropylene (PP). Suitable materials or barriers may have various pore sizes and pore shapes. Combinations of different non-conducting materials or structures can be used.

In another example the porous or gas permeable material or barrier includes a conducting material or structure, for example a conducting carbon material such as carbon fibre, graphene or carbon nanotubules, or a metal such as Ni, Ti, Cr, Cu, Au or Ag. Suitable materials or barriers may have various pore sizes and pore shapes. Combinations of different conducting materials or structures can be used.

The or gas permeable electrode, e.g. a breathable electrode, may be used in an electrolytic synthesis cell or electrolytic synthesis device. For example, the synthesis may be (but is not limited to) the following example electrochemical reactions and gas products:

1) Nitrogen reduction to form ammonia gas
   $N_2 + 6H^+ + 6e^- \rightarrow 2NH_3$ for example using an enzyme catalyst;
2) $CO_2$ reduction to formic acid gas
   $CO_2 + 2H_2O + 2e^- \rightarrow HCOOH + 2OH^-$ for example using an enzyme and/or copper catalyst;
3) $CO_2$ reduction to CO gas
   $CO_2 + H_2O + 2e^- \rightarrow CO + 2OH^-$ for example using an enzyme and/or copper catalyst;
4) $CO_2$ reduction to formaldehyde gas
   $CO_2 + 3H_2O + 4e^- \rightarrow CH_2O + 4OH^-$ for example using an enzyme and/or copper catalyst;
5) $CO_2$ reduction to methanol gas
   $CO_2 + 5H_2O + 6e^- \rightarrow CH_3OH + 6OH^-$ for example using an enzyme and/or copper catalyst;
6) Halide oxidation to halide gas
   $2Cl^- \rightarrow Cl_2 + 2e^- (2Br^- \rightarrow Br_2 + 2e^-)$ for example using a carbon catalyst;
7) Hydrogen peroxide oxidation to gaseous oxygen
   $H_2O_2 \rightarrow O_2 + 2e^- + 2H^-$ for example using a platinum and/or PEDOT catalyst;
8) Nitrite reduction to nitrous oxide gas
   $2NO_2^- + 6H^+ + 4e^- \rightarrow N_2O + 3H_2O$ for example using an iron porphyrin complex catalyst;
9) Nitrite reduction to ammonia gas
   $2NO_2^- + 8H^+ + 6e^- \rightarrow NH_4^+ + 2H_2O$ for example using an iron porphyrin complex catalyst;
10) Water splitting to oxygen and hydrogen gas
    $2H_2O \rightarrow O_2 + 4e^- + 4H^+$ for example using one or more of a variety of catalysts.

In an example the catalyst is platinum deposited on the porous or gas permeable material or barrier. In other examples the catalyst may be based on an enzyme, copper, carbon or iron porphyrin.

Example cells can not only separate the gases and decrease gas cross-over in a cell, but can also facilitate a more favourable environment for operation of a catalyst, and/or can minimise excessive heating or localised hotspots. In general, increasing partial pressure of certain gases in an electrolytic cell causes increasing degradation of the catalyst. For example, increasing the partial pressure of $O_2$ in an electrolytic cell can cause particular degradation of the anode catalyst. Hence, removal of $O_2$ reduces this effect, permitting the use of catalysts previously unsuitable such as, for example, CdS, CdSe and GaAs.

An example cell is capable of operating without the substantial formation of gas bubbles, for example without the formation of gas bubbles greater than about 125 µm in average diameter, greater than about 100 µm in average diameter, or greater than about 50 µm in average diameter. The cell can, in some embodiments, operate without the formation of any gas bubbles, or at least any visible gas bubbles.

In one example, the catalyst is tuned to produce the gas (hydrogen or oxygen) at a rate that matches the flux across the material or barrier in order to enable complete or near complete withdrawal of the gases without substantial bubble formation. In a particular example, it is desirable, though not necessary, that the advancing contact angle of the porous or gas permeable material or barrier with the electrolyte is greater than 90°. In another example the porous or gas permeable material or barrier is a hydrophobic material or barrier. Suitable materials or barriers can have various pore sizes and pore shapes and can be manufactured from various hydrophobic materials. The materials or barriers can have a pore size less than 0.5 µm, less than 0.1 µm or less than 0.05 µm, for example.

In another example the porous or gas permeable material or barrier itself may or may not be hydrophobic in nature but be coated with a thin film of hydrophobic material. Suitable hydrophobic material may be, for example, silicone and enhance the wetability of the porous material or barrier whilst still providing the requisite degree of breathability (having a sufficient flux of the gas across the material or barrier). Other suitable thin-film layers or coatings may be selected from the group consisting of silicone-fluoropolymer, polydimethylsiloxane (PDMS) or its copolymers with fluoromonomers, PDD-TFE (perfluoro-2,2-dimethyl-1,3-dioxole with tetrafluoroethylene), either individually or in any combinations thereof.

The Young-Laplace equation defining the capillary pressure, Pc, can be used as guidance for selection of materials and pore size for the material. It states that the capillary pressure ($p_c$) is proportional to the surface tension ($\gamma$) and inversely proportional to the effective radius (r) of the interface, and also depends on the wetting contact angle ($\theta$) of the liquid on the surface of the capillary, according to:

$$p_c = \frac{2\gamma\cos\theta}{r}$$

As the contact angle approaches 90° the capillary pressure goes towards zero (and eventually changes sign) resulting in wetting of the material or barrier. This is theoretically limiting possible material or barrier materials to those with a contact angle above 90°. Table 1 lists average surface tension and water contact angles for example hydrophobic polymers. It should be taken into account that the production method and material grade can result in some variation in contact angle. For example, for polystyrene contact angles up to 98° have been reported whereas the average is below 90°. For experts in the field it will be obvious that only the part of the material or barrier that is in direct contact with water needs to have a high contact angle and that this can be obtained, for example, by coating one side of a (hydrophilic) material with one of the example polymers from, the list below. Some carbon materials (e.g. carbon fibre) have a contact angle higher than 90° and therefore may be used directly as a conducting hydrophobic material. However, adequate catalysts would preferably be coated onto these carbon materials.

TABLE 1

| Polymer Name | Surface Tension ($\gamma$) mJ/m$^2$ | Contact Angle |
| --- | --- | --- |
| Polyvinyl fluoride (PVF) | 32.7 | 84.5 |
| Polyvinyl chloride (PVC) | 37.9 | 85.6 |
| Nylon 8,8 | 34 | 86 |
| Nylon 9,9 | 34 | 86 |
| Polystyrene (PS) | 34 | 87.4 |
| Polyvinylidene fluoride (PVDF) | 31.6 | 89 |
| Poly n-butyl methacrylate (PnBMA) | 29.8 | 91 |
| Polytrifluoroethylene | 26.5 | 92 |
| Nylon 10,10 | 32 | 94 |
| Polybutadiene | 29.3 | 96 |
| Polyethylene (PE) | 31.6 | 96 |
| Polychlorotrifluoroethylene (PCTFE) | 30.8 | 99.3 |
| Polypropylene (PP) | 30.5 | 102.1 |
| Polydimethylsiloxane (PDMS) | 20.1 | 107.2 |
| Poly t-butyl methacrylate (PtBMA) | 18.1 | 108.1 |
| Fluorinated ethylene propylene (FEP) | 19.1 | 108.5 |
| Hexatriacontane | 20.6 | 108.5 |
| Paraffin | 24.8 | 108.9 |
| Polytetrafluoroethylene (PTFE) | 19.4 | 109.2 |
| Poly(hexafluoropropylene) | 16.9 | 112 |
| Polyisobutylene (PIB, butyl rubber) | 27 | 112.1 |

For example, with reference to the Young-Laplace equation above, for a polytetrafluoroethylene (PTFE) material in contact with liquid water, the contact angles are typically 100-115°. The surface tension of water is typically 0.07197 N/m at 25° C. If the water contains an electrolyte such as 1 M KOH, then the surface tension of the water typically increases to 0.07480 N/m. Applying these parameters to the Washburn equation yields the data presented in Table 2:

TABLE 2

| Pore size of material, micrometers | Contact Angle of the liquid with the material, degrees | Pressure to wet/dewet pore, Pa (N/m2) | Pressure to wet/dewet pore, Pa (bar) | Pressure to wet/dewet pore, Pa (psi) |
| --- | --- | --- | --- | --- |
| 10 | 115 | 6322 | 0.06 | 0.9 |
| 5 | 115 | 12645 | 0.13 | 1.8 |
| 1 | 115 | 63224 | 0.63 | 9.2 |
| 0.5 | 115 | 126447 | 1.26 | 18.3 |
| 0.3 | 115 | 210746 | 2.11 | 30.6 |
| 0.1 | 115 | 632237 | 6.32 | 91.7 |
| 0.05 | 115 | 1264474 | 12.64 | 183.3 |
| 0.025 | 115 | 2528948 | 25.29 | 366.7 |
| 0.013 | 115 | 4863361 | 48.63 | 705.2 |
| 0.01 | 115 | 6322369 | 63.22 | 916.7 |
| 10 | 100 | 2598 | 0.03 | 0.4 |
| 5 | 100 | 5196 | 0.05 | 0.8 |

TABLE 2-continued

| Pore size of material, micrometers | Contact Angle of the liquid with the material, degrees | Pressure to wet/dewet pore, Pa (N/m2) | Pressure to wet/dewet pore, Pa (bar) | Pressure to wet/dewet pore, Pa (psi) |
| --- | --- | --- | --- | --- |
| 1 | 100 | 25978 | 0.26 | 3.8 |
| 0.5 | 100 | 51956 | 0.52 | 7.5 |
| 0.3 | 100 | 86593 | 0.87 | 12.6 |
| 0.1 | 100 | 259778 | 2.60 | 37.7 |
| 0.05 | 100 | 519555 | 5.20 | 75.3 |
| 0.025 | 100 | 1039111 | 10.39 | 150.7 |
| 0.013 | 100 | 1998290 | 19.98 | 289.8 |
| 0.01 | 100 | 2597777 | 25.98 | 376.7 |

The calculated capillary pressure of the materials or barriers tested and found to be suitable range from −2500 Pa (Mitex (PTFE)) to −132000 Pa (Celgard 880 (PE)) and thereby underline the large design freedom for the choice of materials or barriers. The negative sign of the pressure values indicates that the capillary pressure is directed out of the pore and thereby prevents flooding of the material. In an example the capillary pressure of the material is below −5000 Pa. For systems where water is dispersed or dissolved in a hydrophobic electrolyte the considerations regarding capillary pressure are still valid, but in this case a hydrophilic material or barrier should be used to avoid solvent penetration into the material.

Combining the example electrodes with catalysts and/or photo-catalysts of various types, e.g. non-precious metal and metal oxides, allows greater scope for fabrication of cost efficient and straightforward electrolytic devices for a range of applications. Thus, in one example, there is provided a gas permeable electrode structure or breathable electrode structure that can be used to directly separate gases in an electrolytic reaction.

Advantages provided by various example cells, and electrodes for use therewith, include, for example:
- efficient removal of gases from the electrolytic reaction;
- improved efficiency of a cell;
- improved electrical efficiency of electrochemical systems in terms of reduced resistance and reduced voltage at a given current;
- reduced heat/energy generation and dissipation from the electrode;
- reduced localised 'spot-heating' of the electrode;
- reduced heat degradation of the electrode and other cell components;
- reduced operation temperature;
- the direct separation of gases negates the need for a separator;
- production of high purity gases;
- provides a more favourable, lower temperature environment for operation of a catalyst;
- facilitates use of otherwise unsuitable catalysts that would be degraded as partial pressure of certain gases increases;
- direct separation of gases decreases gas cross over and thereby can enhance columbic efficiency; and/or
- combination of the electrode with optimised catalysts or photocatalysts allows fabrication of more cost efficient electrolytic devices.

Example I

Electrodes Based on a Porous Non-Conducting Material

The following examples provide a more detailed discussion of particular embodiments. The examples are intended to be merely illustrative and not limiting to the scope of the present invention. Three example material based electrodes with different morphology and pore sizes and shapes were prepared and studied. Platinum, the most well studied catalyst, was used as the model catalyst material. However, the electrodes of the present invention should not be interpreted as being limited to this catalyst and can be operated with many other catalysts.

Polymer Material Treatment And Coating

Referring firstly to FIG. 8, there is illustrated an example method 80 for manufacturing a gas permeable electrode or breathable electrode based on a porous non-conductive material or barrier. Initially, at step 82, the porous non-conductive material or barrier, for example a porous polymer material, is treated using polymerisation, for example plasma polymerisation, to facilitate improved bonding of a metal layer. At step 84, the polymerised porous non-conductive material or barrier is coated, or at least partially coating, with a metal, for example gold, although a number of other metals can be used. At step 86, a catalyst, or more than one catalyst, can be applied, for example as a further application or coating. In one example the catalyst can be platinum applied as a further, at least partial, layer or coating.

In a more specific example, polytetrafluoroethylene (PTFE) materials (Goretex®) were obtained from Gore Inc and Mitex™ (10 μm) was obtained from Millipore. Au mylar (2.5 Ohm/square) was purchased from CPFilms Inc. Maleic anhydride was obtained from Sigma-Aldrich. Preparation of the Goretex®, Mitex™, polyethylene (PE) and polypropylene (PP) materials prior to Pt coating was similar to previous work described by Winther-Jensen et al entitled 'High rates of oxygen reduction over a vapor phase-polymerized PEDOT electrode' in *Science* 2008; 321:671-4.

Maleic anhydride was grafted onto the hydrophobic surface of the materials, to ensure good bonding to a subsequently applied gold conducting layer, using plasma polymerisation. The gold was sputtered onto the plasma treated materials and its thickness was optimised to give a surface resistance ~5 Ohm/sq. The Pt was then sputtered on top of the gold layer at 28-30 mA for 60 sec. A traditional Gas Diffusion Electrode (GDE) was also studied for comparison; this was an ionomer free (LT-140EW-30% Pt on Vulcan XC-72, 0.5 mg cm$^{-2}$) from E-TEK and used as supplied. SEM images were obtained using a JEOL 7100F Field Emission Gun Scanning Electron Microscope at 5 kV.

The produced porous electrode based on the porous PTFE (Goretex®) material will be referred to as "porous electrode (G)" (i.e. Pt-coated Au/Goretex®). The produced porous electrode based on the porous PTFE (Mitex™) material will be referred to as "porous electrode (M)" (i.e. Pt-coated Au/Mitex™).

It should be appreciated that other forms of porous materials can be used, for example based on other, porous forms of polymers, such as polytetrafluoroethylene (PTFE), polyethylene (PE) or polypropylene (PP), for example with a microstructure having nodes interconnected by fibrils.

Electrode And Cell Assembly

The produced gas permeable electrodes or breathable electrodes were sandwiched with a gold strip using a conventional laminator. A 0.7 cm$^2$ window in the laminate allowed access for electrolyte to the Pt coated side of the produced electrodes and for the gas to breathe out to the adjacent chamber when mounted on a test cell with double-sided adhesive tape (FIGS. 1a, 1b, 1c).

Figure 1A:
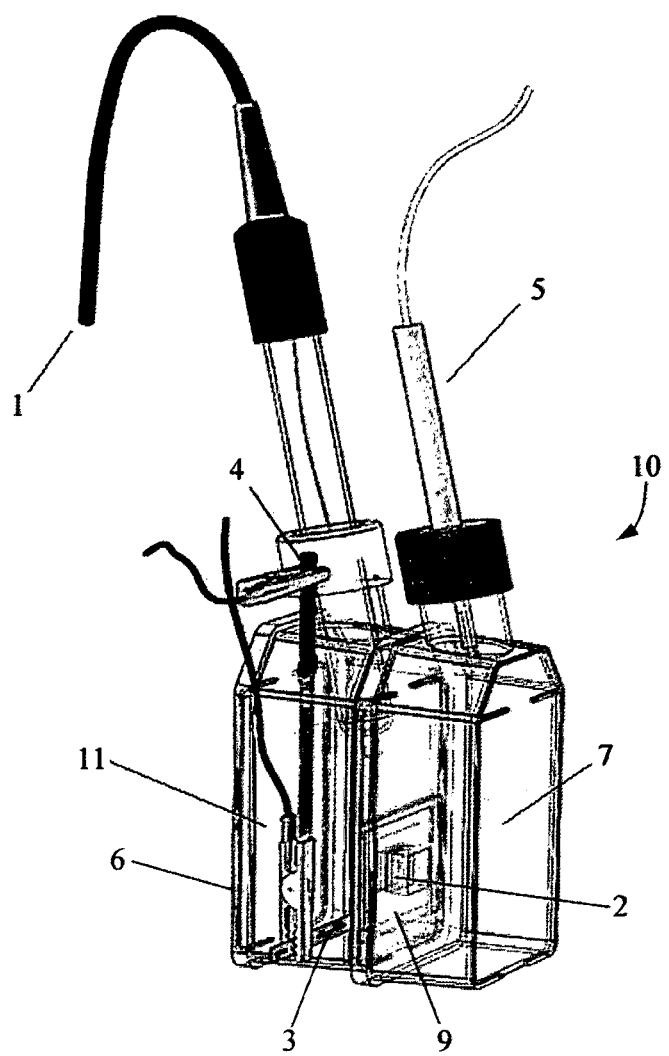
FIG. 1a is a schematic of an example electrolytic cell.

FIG. 1a illustrates an example electrolytic cell 10, which includes reference electrode 1, at least partially porous anode 3, cathode 4, and oxygen probe 5 attached to gas collection chamber 7 (i.e. a half breathing cell). Electrolysis chamber 6 houses an electrolyte 11. Gas permeable electrode 2 is part of anode 3 and includes a porous material or barrier. Gas permeable electrode 2 is in contact with electrolyte 11 via a window in laminate 9. In an operational cell, oxygen gas and/or hydrogen gas can be transported away from the electrodes or the cell, for example using gas transport passages or pipes.

Figure 1B:
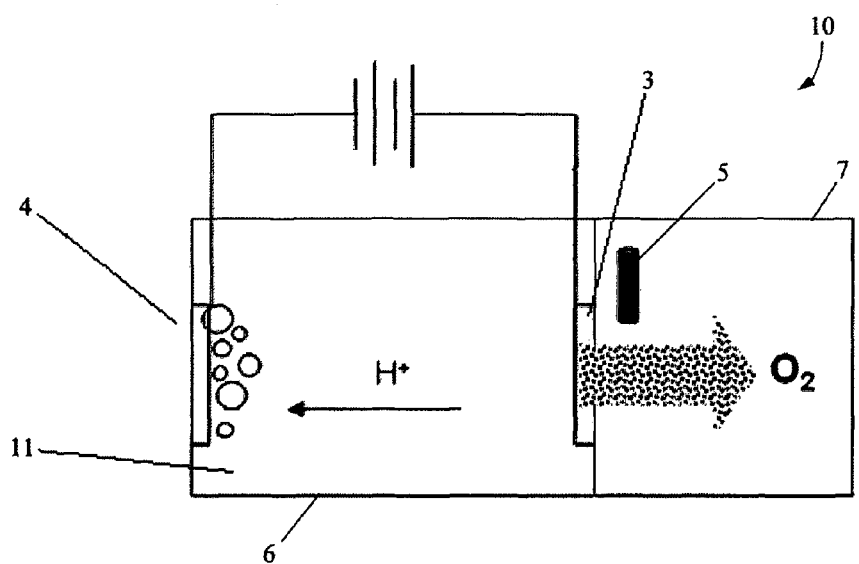

FIG. 1*b* illustrates a schematic of gas ($O_2$) and ion ($H^+$) movements for the half breathing cell 10 of FIG. 1*a*. An electrical potential is applied between anode 3 and cathode 4. Oxygen gas, without substantial bubble formation, is shown as forming or being passed through to gas collection chamber 7. Whereas, gas bubbles, in this example hydrogen gas bubbles, are shown as forming at cathode 4 in electrolyte 11. The relative position of a micro-oxygen electrode of oxygen probe 5 is illustrated.

Figure 1C:
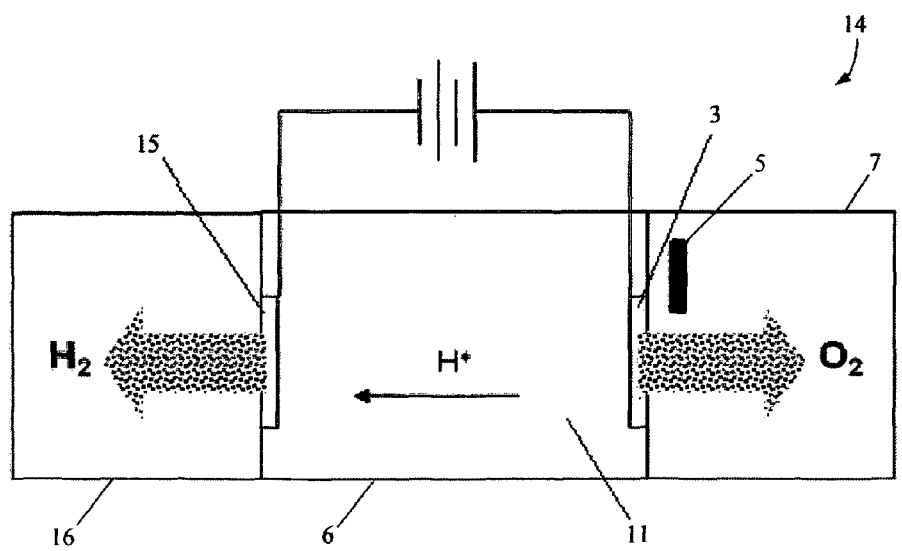
FIG. 1c illustrates gas and ion movements in another example full breathing cell.

FIG. 1*c* illustrates gas and ion movements in an example full breathing cell 14. An electrical potential is applied between anode 3 and cathode 15. In this example cathode 15 also includes a porous electrode being at least partially formed of a gas permeable material or barrier. Hydrogen gas is shown as forming or being passed through to second gas collection chamber 16, without substantial formation of bubbles.

Experimental Set-Up And Gas Measurement

Sodium p-toluene sulphonate (from Sigma Aldrich) 0.05 M pH 4 was used as electrolyte 11. 30 ml of electrolyte 11 was used in test cell 10 leaving 30 ml gas space above electrolyte 11. A three electrode cell 10 was set-up using a saturated calomel reference electrode (SCE) 1 and carbon rod or Pt counter electrode 4. A multi-channel potentiostat (VMP2 from Princeton Applied Research) was used for the constant-current electrolysis. The distance between the electrodes, in this example, is 1.5 cm and the potential during operation of all working electrodes was typically ~2-2.4 V vs SCE.

The Micro-Oxygen Electrode 5 was obtained from eDAQ and used to monitor $O_2$ evolution from the electrolysis reactions. It was calibrated at 21% $O_2$ in air and 0% $O_2$ in pure nitrogen gas. The slope from the calibration was 10.3 mV equals 1% $O_2$. The amount of $H_2$ was measured using gas chromatography (SRI 310C, MS-5A column, TCD, Ar carrier).

Results

The test cell 10 was set up as shown in FIGS. 1*a* and 1*b*. Firstly, the experiments were focused on water oxidation (WO), although a variety of other applications are possible. A Pt coated porous material or barrier was used as part of anode 3 and the liberated $O_2$ was monitored using a micro-oxygen electrode 5 placed in gas collection chamber 7 (60 ml) on the back side of porous electrode 2 (FIG. 1*a*).

Figure 2:
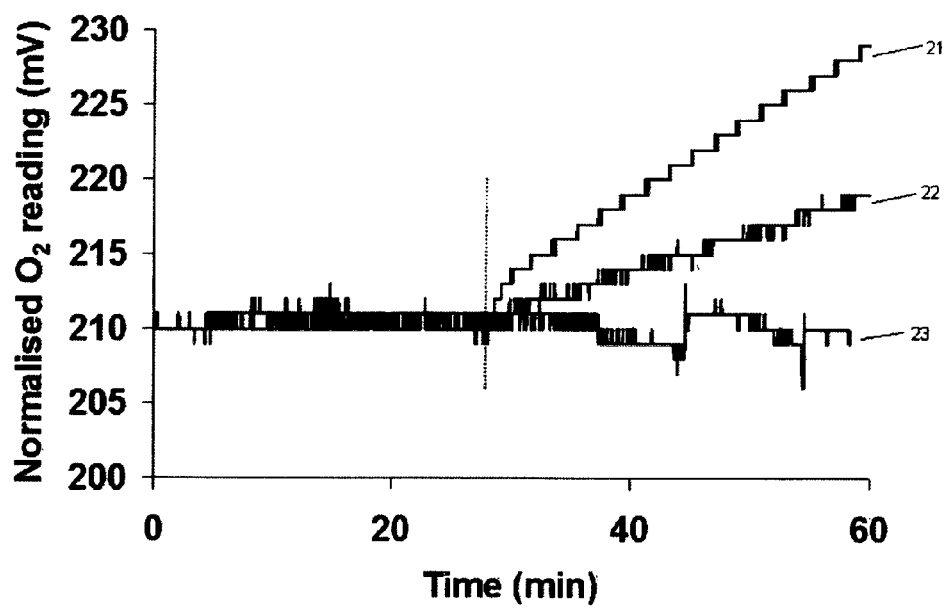
FIG. 2 illustrates $O_2$ measurement behind different Pt-coated example materials (Au/Goretex® 21, Au/Mitex™ 10 μm 22 and GDE 23).

Several seconds after 10 mA current was applied to cell 10, bubbles started to form on counter electrode 4 (carbon rod). On anode 3, bubbles were not observed on the working area when porous electrode (G) 21 was used. This suggested that the major portion of the $O_2$ was able to escape to the back side chamber 7 of electrode 2. Some bubble formation was observed on the working area when the other materials were used. The $O_2$ content of the back side chamber 7 steadily increased during electrolysis for both porous electrode (G) 21 and porous electrode (M) 22, but remained unchanged for the GDE 23 (FIG. 2), suggesting no $O_2$ production in the latter case. The $O_2$ evolution rate from porous electrode (G) was the highest, indicating that porous electrode (G) is the most efficient in emitting gaseous $O_2$ from the water oxidation reaction.

Figure 3:
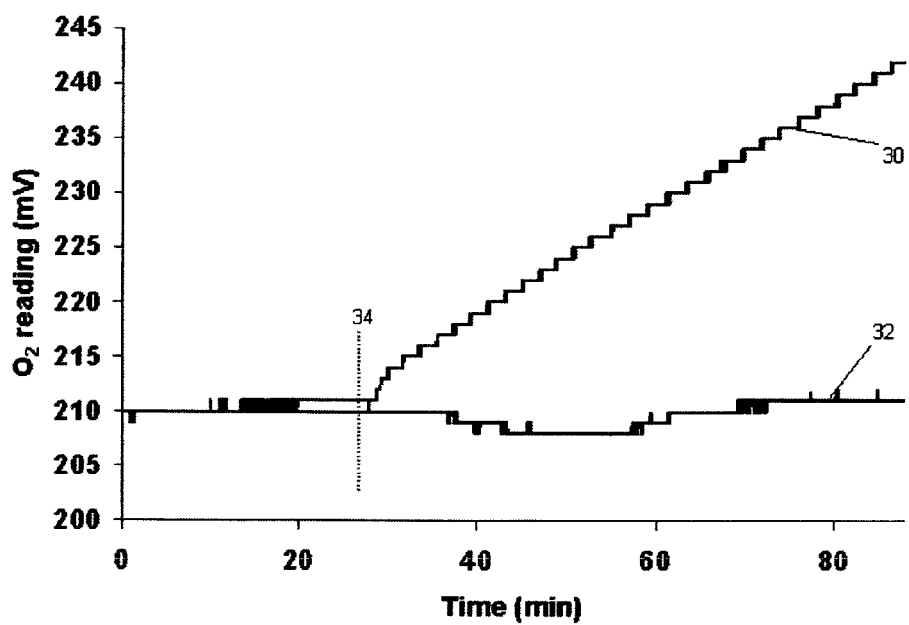
FIG. 3 illustrates $O_2$ measurements above the electrolyte ('$O_2$ front' 30) and behind the example material in the adjacent chamber ('$O_2$ back' 32) after commencement of the application of a current of 10 mA at time 34.

Further investigation was performed by monitoring the $O_2$ evolution in the head space above electrolyte 11, in front chamber 6, during water splitting with porous electrode (G). The result (FIG. 3) showed no measurable increase in $O_2$ above electrolyte 11, indicating a very high efficiency in removing $O_2$ into the back chamber 7. The Faradaic efficiency in these experiments was 90±3%.

Figure 4:
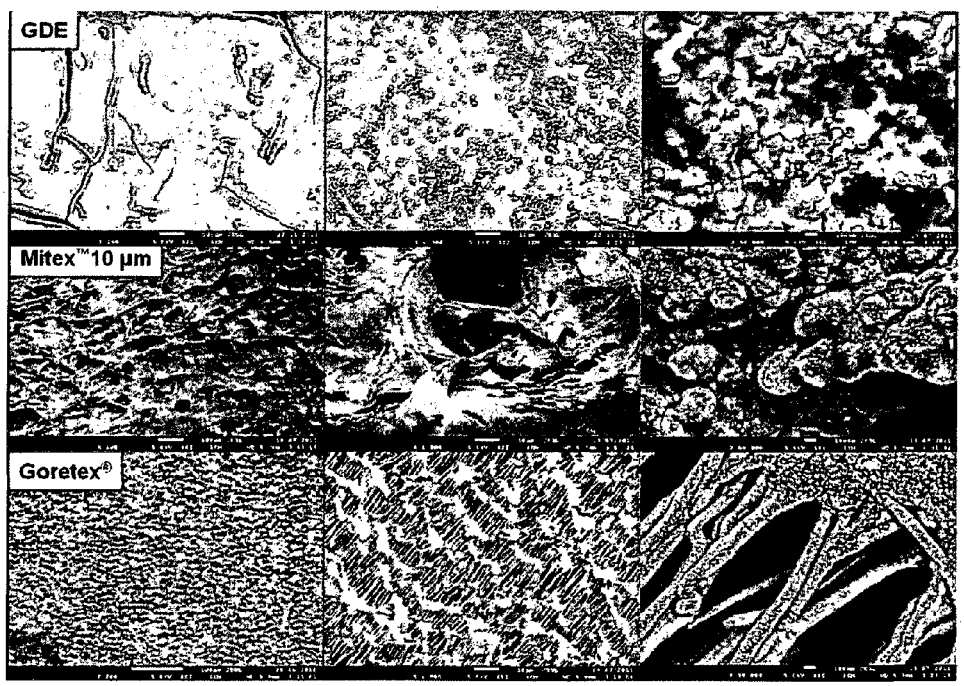
FIG. 4 shows a series of scanning electron micrographs (SEM) of Pt-coated Au/Goretex®, Au/Mitex™ 10 μm and GDE. (Scale bars: left column—100 μm, middle column—10 μm and right column—10 nm).

In order to understand the "breathing" ability of each electrode or material, scanning electron microscopy was performed as shown in FIG. 4. Pt nanoparticles were well distributed on the material surfaces. The images of the GDE showed a dense, packed structure with Pt nanoparticles ranging from 65 to 100 nm. The size of the sputtered Pt nanoparticles was in the range of 30-40 nm on the materials. The images for the porous electrode (M) showed inconsistent pore size and distribution, whereas the images for the porous electrode (G) show a fine pore size (~1×10 μm) with consistent distribution. The structure of the porous electrode (G) is believed to contribute to the higher performance observed for the porous electrode (G) in the water splitting experiments.

As a control experiment, a non-porous substrate consisting of Pt-coated Au mylar was used as an anode in a single chamber set-up with oxygen probe 5 placed above electrolyte 11. The $O_2$ produced in this experiment was much lower (0.48 μmol/min) than when using the porous electrode (G) (1.35 μmol/min) in the two chambers set-up. The Faradaic efficiency from this control experiment was only 31%. This indicates the degree of oxygen shuttling between the electrodes in this cell configuration, in the absence of a separator, when a non-porous electrode is used.

In another experiment the Pt-coated Au Mylar was used as the anode and the porous electrode (G) as the cathode, i.e. as the $H_2$ producing electrode. There was no $H_2$ bubble, formation observed on the cathode. The Faradaic efficiency of $O_2$ evolution in this experiment was 61%. When porous electrodes (G) were used for both anode 3 and cathode 15, so that both gases were removed from cell 14, the Faradaic efficiency was increased to 92%. $H_2$ detected in this experiment was found to be close to 2:1 stoichiometric ratio within measurement error (±7%). This suggests that in an optimized cell and gas flow configuration it may be practical to avoid the use of a separator in these cells.

Figure 5:
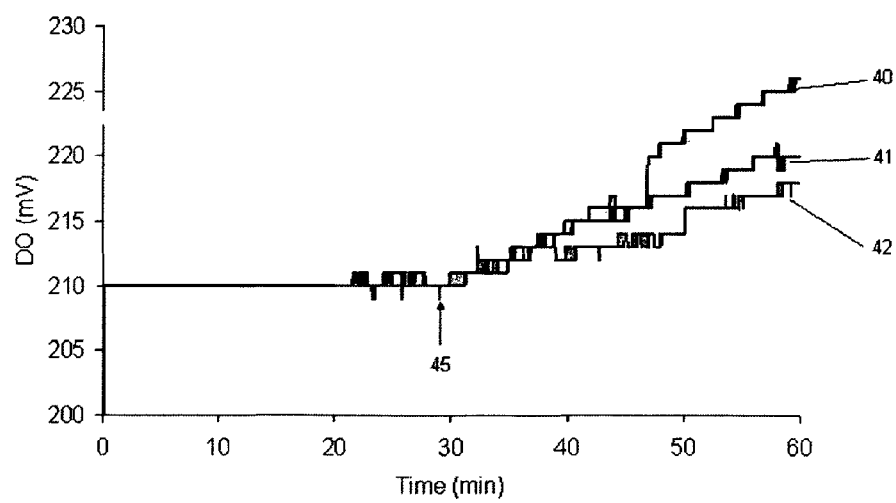
FIG. 5 illustrates $O_2$ measurement behind different Pt-coated example materials (polyethylene (PE) (Celgard 880)

Although Goretex® initially was found to be the best among the three materials tested, there are other materials with different hydrophobicity and various pore sizes and shapes which can be used. A number of these possibilities were tested in an additional experiment. Polyethylene (PE, Celgard 880 (0.1×1 μm poresize)) 40 and polypropylene (PP) mesh (5 μm poresize) 41 and PP non-woven (5 μm poresize) 42 materials were tested in a similar way as described above (see FIG. 5). The Celgard 880 performed nearly as good as the Goretex® as seen from the increase in oxygen measured on the back chamber of the setup, which corresponded to a faradaic efficiency of 82%. The two PP materials were less efficient (51% and 41% respectively), however clearly showed that this material can be used for the porous material or barrier structure.

Stability Test Of Cds On Ti/Au/Goretex And Baseline Test Using Ti/Au/Goretex

In another test, electrodes were formed from Au coated Goretex®, as previously, but then coated with Ti. One of the electrodes was further coated with CdS. The CdS/Ti/Au/Goretex and Ti/Au/Goretex (0.5 cm²) electrodes were laminated and sandwiched between two plastic bottles. The front chamber 6 was filled up with 0.05 M NaPTS pH 6.75 30 ml. An oxygen sensor 5 was placed in the gas back chamber 7. Black cloth was used to cover the chamber 7 to protect the light directly shining on the DO probe. An Asahi lamp was used to shine the light on the sample. Each data point was collected after the following procedure: $N_2$ gas was used to purged the electrolyte for about 15 min or until stable baseline was achieved and in the same time $O_2$ was flushed into the back chamber, immediately after removal of $N_2$ (and the hole was sealed) the light was shone on the sample for 7 min, $O_2$ was then removed (and the hole was sealed) with the light continued to shine for another 5 min. This process has been repeated for 39 cycles. The $O_2$ increased was monitored and typical graph was shown in FIG. 6.

The data was then plotted as the rate of $O_2$ increased (increased in $O_2$ reading over, typically, 12 min light exposure) versus light exposed time (FIG. 7). From FIG. 7 it can be seen that the $O_2$ evolution rate from the CdS/Ti/Au/Goretex electrode 60 was higher than the baseline from the Ti/Au/Goretex electrode 61 and stable for more than 8 hours. This result should be compared to the usual degradation of CdS within several minutes under light/oxygen evolution.

The surface treatment, using polyacid and plasma polymerisation, is an important step to ensure a good cohesion between the catalyst and the material. It also opens the route to deposit the catalyst onto hydrophobic materials. The possibility of merging this technology with some of the non-precious metal and metal oxide catalysts that have limited use in PEM electrolysers leads to a facile and cost efficient water splitting device. It is also possible to use this approach to enhance the lifetime of photo-active electro-catalysts, many of which are sensitive to the presence of oxygen bubbles.

Example II

Electrodes Based on a Porous Conductive Material

The following examples provide a more detailed discussion of further particular embodiments. The examples are intended to be merely illustrative and not limiting to the scope of the present invention.

The previous examples discussed porous hydrophobic polymer materials or barriers that are coated with conductive material(s) to form an electrode where gases produced can diffuse out through the electrode, with the advantages of separating the gases as well as preventing bubble formation that can prevent further reaction or corrode the electrode. While these improved electrode structures separate gas and prevent bubble formation, they have a relatively high resistance. The relatively high resistance is associated with the applied metal layer of the breathable electrodes and causes voltage loss. As a result, large cells might be expensive to run in large-scale applications. Furthermore, high resistance is associated with heating of the electrode and formation of localised hot-spots might occur which could cause vapour formation and eventually burns parts of the electrode or other components of the cell, reducing efficiency and requiring increased maintenance.

In another example there is provided a method of manufacturing a gas permeable electrode or breathable electrode including the steps of providing a porous or gas permeable conducting material or barrier, and applying or associating a hydrophobic layer or coating to a first side of the material or barrier. In another example, the porous or gas permeable conducting material or barrier includes a conducting material or structure, for example including or comprised of a conducting carbon material such as carbon fibre, graphene or carbon nanotubules, or including or comprised of a metal such as Ni, Ti, Cr, Cu, Au or Ag. Suitable materials or barriers can have various pore sizes and pore shapes. Combinations of different conducting materials or structures, or formed together with non-conducting materials or structures, can be used. In another example, the porous or gas permeable conducting material or barrier itself may be hydrophobic.

In contrast to the previously discussed examples (Example I section), where a conducting layer is applied to a hydrophobic polymer-based material or barrier, in the examples of this section (Example II section) there is initially provided a porous conducting material or barrier, for example of metal or carbon, having an inherently low resistance, and then associating or applying a hydrophobic layer or coating to one side only of the conducting material or barrier. Without wishing to be bound by theory it appears that one of the functions performed by the hydrophobic layer or coating is to prevent electrolyte from leaking out through the material or barrier.

Gas permeable or breathable electrodes of the previously discussed examples (Example I section) typically have an operating voltage of as much as 4 Volts, as compared with about 2 Volts for gas permeable or breathable electrodes manufactured according to the examples of this section (Example II section) at the same current. Concomitantly, the previously discussed electrodes typically have resistance of about 10 $\Omega/m^2$ for a given current, whereas gas permeable or breathable electrodes manufactured according to the examples of this section have a resistance of <1 $\Omega/m^2$ at the same current. This is advantageous because the lower the voltage and resistance in the electrode, the less the electrode heats up.

FIG. 9 illustrates an example method 90 for manufacturing a gas permeable, porous or breathable electrode based on a porous conductive material or bather. At optional step 92, pre-treatment of the gas permeable or porous conductive material or barrier is applied, for example to remove oxide prior to associating or applying the hydrophobic layer or coating or to remove impurities or clean or process the conductive surface. At step 94, a hydrophobic layer or coating is at least partially applied to or associated with a first side of the gas permeable or porous conductive material or barrier. At optional step 96, a catalyst, or more than one catalyst, can be at least partially coated on or applied to or onto a second side of the gas permeable or porous conductive material or barrier, that is on the opposite exposed conductive or metallic electrode surface.

In another example there is provided a method of manufacturing a gas permeable or breathable electrode comprising the steps of: providing a gas permeable or porous conducting material; optionally, pre-treating the gas permeable or porous conducting material, for example to remove oxides; at least partially associating or applying a hydrophobic layer or coating to a first side of the gas permeable or porous conducting material; and applying a catalyst to at least part of the second side of the gas permeable or porous conducting material. The step of applying the catalyst to the second side of the gas permeable or porous conducting material can be carried out before, after or at the same time as the step of applying the hydrophobic coating to the first side of the gas permeable or porous conducting material.

FIG. 11 illustrates a cross-sectional view of an example porous gas permeable or breathable electrode 110 in contact with an electrolyte 118. The electrode 110 includes a gas permeable or porous conductive layer, barrier or material 112. On a first side of the porous conductive layer, barrier or material 112 is a hydrophobic layer, barrier or material 114, for example a hydrophobic polymer material. On a second side and/or within the porous conductive layer, barrier or material 112 is one or more catalysts 116. The one or more catalysts can be provided as a generally adjacent layer, coextensive with, and/or within the pores or spaces of the porous conductive layer, barrier or material 112. In specific non-limiting examples, the porous conductive layer, barrier or material 112 is nickel or copper, and the hydrophobic layer, barrier or material 114 is poly-perfluoro(methyldecalin).

Porous Conductive Material

The gas permeable or porous conductive material or barrier is preferably chosen or selected from porous carbon materials or porous metal materials. Preferably the porous conductive material has a resistance less than 3 $\Omega/m^2$, more preferably less than 1 $\Omega/m^2$. The porous conductive material preferably has a pore size less than 50 μm, more preferably less than 20 μm or less than 10 μm. Although a wide range of conductive materials, such as metals, would be suitable for use as a porous conductive material, particularly preferred are the known 'stable' oxide-forming metals such as Ni, Ti and Cr and the 'noble' metals such as Cu, Au, Ag.

In an example the porous conductive material comprises non-woven carbon fibre and there are many such materials commercially available in a range of pore sizes and thicknesses. Woven carbon fibre may also be suitable but current commercially available woven carbon fibres are typically too thick. Carbon nanotube felts may be suitable provided the pore-size is not too small.

In another example the porous conductive material is metal, or a combination of metals, comprising woven mesh, non-woven mesh, grid, net, lattice, web or other porous structure. In preferred examples the porous conductive material is comprised of woven or non-woven copper, woven or non-woven copper coated fibres, woven or non-woven nickel, or woven or non-woven nickel coated fibres.

The material may comprise a conductive material (such as carbon or metal) which is supported. For example, the material may be formed by coating, applying, sputtering or layering conductive material onto fibres, strands, fabric or other substrate, which is then woven to form the porous conducting material.

Pre-Treatment Of The Porous Conductive Material

It may be preferable to pre-treat the porous conducting material prior to addition of the hydrophobic layer or coating, for example to remove an oxide layer or particles. Specifically, an unstable layer of oxide can form at the surface of the conducting material, particularly if the conducting material is a metal or carbon. In addition, the oxide layer may grow between the surface and the hydrophobic layer when a potential is applied to the electrode. This typically causes a loss of hydrophobicity and can cause the hydrophobic layer or coating to detach from the metal.

Accordingly, it may be desirable to carry out a surface reduction, to remove oxides on the conducting material surface to ensure or improve direct bonding between the conducting surface, such as metal or carbon, and the hydrophobic layer or coating. The pre-treatment can be carried out by any known technique, such as using hydrogen plasma, or traditional chemical reduction pre-treatment. Plasma techniques are particularly preferred because the material surface can be readily kept oxygen free until the hydrophobic layer or coating is applied.

Hydrophobic Layer Or Coating

The hydrophobic layer or coating may be applied to or associated with at least part of the porous conducting material by any convenient method, such as plasma-polymerisation, spraying or solvent based coating methods. Some example methods suitable for coating the porous conducting material are disclosed in International Patent Publication No. WO 2001/085635 (Winther-Jensen).

In a preferred method, the hydrophobic layer or coating is applied by plasma-polymerisation. This application method is preferred because it can be 'tuned' to finely control penetration of the polymer into the porous conducting material. As a result, the application by plasma-polymerisation can be optimised for a given material. A wide range of hydrophobic coatings can be used, for example based on fluorinated precursors.

Similarly, with regard to spray-coating, a number of Teflon™-like, solvent soluble polymers are available such as fluorinated ethylene propylene (FEP).

However, for any application technique used it is important that the penetration of the hydrophobic layer or coating into the porous conducting material can be finely controlled without isolating or covering the opposite metallic side of the electrode, that is the hydrophobic layer or coating should only penetrate or extend part of the way, or perhaps not at all, into the porous conducting material and should not cover or overlay the opposite side of the electrode.

The hydrophobic layer or coating may be created from a wide range of precursor monomers including hydrocarbons such as C1-C16 alkanes such as undecane, C-C16 alkenes, C2-C16 alkynes, styrene, aromatic monomers of styrene compounds, monomers of vinyl- and acrylate-compounds. Fluorinated hydrocarbon precursors are particularly preferred because they provide superior prevention of electrolyte leakage through the material during use. In a preferred embodiment the hydrophobic layer or coating is created from precursors chosen from perfluoro(methyldecalin), 1H,1H,2H-perfluoro-1-decene and other fluorinated hydrocarbons. A number of other suitable fluorinated hydrocarbon precursors will be apparent to the skilled person in the art.

Catalysts

The porous conductive material may act as a reaction catalyst. Alternatively, one or more catalysts may be applied to at least part of the side of the conductive material not already covered by the hydrophobic layer or coating. The catalyst may be chosen from known catalysts appropriate for the reaction occurring on the electrode. Generally, precious metals such as platinum, gold and palladium can be used, or other well known rare elements such as Ru and Ir and their complexes, Mn complexes and complexes of abundant metals such as Fe, $NiO_x$ and Co can be used.

For increased stability, such metal-oxide catalysts may contain an additional element such as phosphor. Conducting polymers such as poly(3,4-ethylenedioxythiophene) and polypyrrole, Co, Ni, Fe complexes and $MoS_x$ can be used as catalysts. The choice of catalyst will depend at least in part on operating conditions such as temperature, salinity and pH of the electrolyte.

In a preferred example the breathable electrode comprises a hydrophobic coating-conducting material-catalyst combination chosen from poly(perfluoro(methyldecalin))-carbon fibre-PEDOT (where PEDOT is poly(3,4-ethylenedioxy thiophene), poly(perfluoro(methyldecalin))-copper-platinum, poly(perfluoro(methyldecalin))-nickel or poly(perfluoro Electrode And Cell Assembly (methyldecalin))-nickel-platinum.

More specific examples of a range of porous conducting materials were tested in an electrolytic cell as follows:

Material 1: Standard "non-woven" carbon gas-diffusion material for fuel-cell applications (average pore size of 25 micron, 300 micron thick).

Material 2: Nickel wire mesh; 60 micron wire/60 micron pore, single layer.

Material 3: Cu coated nylon 11 fibers woven into flexible fabric. Pore size ca. 20 micron.

Material 4: Woven, Ni coated fabric (Laird Technologies #3055-213).

Material 5: Non-woven, Ni coated fabric (Laird Technologies #3029-217).

For initial testing, all the porous conducting materials were simply laminated with a gold connector and separately mounted in electrochemical cell, so the electrolyte was in contact with one side of the porous conducting material and the other side of the porous conducting material was facing the surrounding air. The materials were used as working electrodes with an applied potential of 0.5 V (V vs. SCE) in a 0.1M $H_2SO_4$ electrolyte. The materials 2 to 5 showed instant wetting of the pores when the potential was applied, followed by leaking of the electrolyte. Material 1 worked for about 30 min before leakage of electrolyte was detected.

A second set of electrodes made from materials 1 to 5 were prepared and mounted on a holder for plasma treatment in such a manner that only one side of the porous conducting materials faced the plasma. The samples were placed in a 2 litre plasma chamber of the type described in International Patent Publication No. WO 2002/035895 and the pressure lowered to 5 Pa with a 1.5 ml/min flow of argon. Thereafter a 10 ml/min flow of hydrogen gas was added, increasing the total pressure to 20 Pa. The plasma discharge was then turned on with 20 mA of power and was continued for 0.10 min in order to clean and reduce the surface of the porous conducting materials.

After this initial treatment the hydrogen flow was switched off, simultaneously with commencement of the flow of a perfluoro(methyldecalin) precursor which was adjusted until a pressure of 10 Pa was reached at a plasma current of 10 mA. These polymerization conditions were maintained for 20 min, then power and precursor flow was turned off and the chamber flushed several times with argon to remove traces of precursor and exited species. After allowing the chamber to reach atmospheric pressure the samples were removed from the chamber and the holder. The nature of the plasma coating was tested by ATR-FTIR, where a polyethylene material treated in the same batch as the electrodes was used as substrate.

FIG. 10 shows an FTIR trace before and after the polymerization of perfluoro(methyldecalin), clearly showing the characteristic CF2 and CF3 signatures in the 1150-1250 $cm^{-1}$ region on the treated sample. The porous conducting materials were further examined by measuring the contact angle to water and they all had receding contact angle values of over 150°.

A small amount of platinum was applied as catalyst to the side of the porous conducting materials that had not been exposed to the plasma polymerization. The platinum was applied using standard sputtering methodology and equipment (for 30 seconds at 25 mA). The samples were then mounted as working electrodes in the same electrolytic cell, of a type similar to cell 14, so that the platinum catalyst coated side contacted the electrolyte and the hydrophobic material coated side faced the air for each electrode, and tested under the same conditions as under the initial testing.

The results observed for each of the five electrodes corresponding to the materials tested were as follows.

Material 1 electrode: No leakage was detected after 10 days of continuous operation at -0.5 V and about 6 $mA/cm^2$ of current. However, a minor amount of hydrogen bubbles were detected and an additional experiment revealed that for this particular material bubble formation started at currents above 4 $mA/cm^2$.

Material 2 electrode: Leakage was detected after 5 days of continuous operation (-0.5 V, 6.5 $mA/cm^2$) in one corner of the electrode. No bubble formation was observed.

Material 3 electrode: No leakage was detected after 10 days of continuous operation at -0.5 V and about 6 $mA/cm^2$ of current. No bubble formation was observed. However, when the reducing potential was switched off the copper quickly dissolved in the acidic electrolyte.

Material 4 electrode: No leakage was detected after 10 days of continuous operation at -0.5 V and about 6 $mA/cm^2$ of current. No bubble formation was observed.

Material 5 electrode: Leakage was observed almost immediately after start of the experiment. Without wishing to be bound by theory, it is assumed that this is due to the nature of the material, where the metallic coating is applied to the fabric after the non-woven structure is formed. For electrodes made from materials 3 and 4 the metallic coating was applied to the polymer fibres before they are woven into the final fabric While the invention has been described in connection with specific embodiments thereof, it will be understood that it is capable of further modification(s). This application is intended to cover any variations, uses or adaptations of the invention in general, the principles of the invention and including such departures from the present disclosure as come within known or ordinary practice within the art to which the invention pertains.

Example III

Further Example Applications

The following examples provide further discussion of particular embodiments. The examples are intended to be merely illustrative and not limiting to the scope of the present invention.

The gas permeable electrode or breathable electrode based on a porous non-conductive material or barrier, discussed previously under the Example I section, has a variety of applications. For example, the gas permeable electrode or breathable electrode can be used in a gas synthesis cell. The gas permeable electrode or breathable electrode can be used in a battery, such as a flow-air battery, a metal-air battery or a reversible metal-air battery. In another example, the gas permeable electrode or breathable electrode can be used in used in a reversible air electrode battery system, such as a reversible polymer air battery. In another example, the gas permeable electrode or breathable electrode can be used in a fuel cell.

In a particular example the gas permeable or breathable electrode can be used to produce $N_2O$ (nitrous oxide) by reducing nitrate on the electrode according to the reaction:

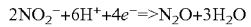

$$2NO_2^- + 6H^+ + 4e^- \Rightarrow N_2O + 3H_2O$$

The electrode can have an active catalyst applied on, for example, a gold-coated porous material (of the kind discussed in Example I). The Applicant has achieved (faraday) efficiencies of >70%, as detected with Gas Chromatography from the $N_2O$ diffused out through the breathable electrode. The rest of the current produces $NH_2OH$, which is also a commercially useful product. The process is pH dependent where lower pH (e.g. pH 4) gives higher production (measured in current) but lower selectivity to $N_2O$ production. The onset of the reaction is around −0.05 V vs SCE, with an overpotential of only about 300 mV. These results have been obtained with a breathable electrode based on a hydrophobic material coated with a metal (in this example gold).

In relation to another particular example, ammonia is one of the most important chemicals produced in the world with more than 130 million tonnes produced yearly. $NH_3$ production is essential for maintaining the agricultural output worldwide. The main current process for ammonia production is the Haber-Bosch process. Although the synthesis of ammonia is exothermic, a significant energy input is needed in order to overcome the high activation energy of 230-420 kJ/mol (103 kJ/mol with iron catalysts). The straight reaction of nitrogen with hydrogen follows the reaction:

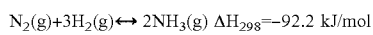

$$N_2(g)+3H_2(g) \leftrightarrow 2NH_3(g) \ \Delta H_{298}=-92.2 \text{ kJ/mol}$$

In an example cell, using the gas permeable or breathable electrode of the kind discussed in Example I, the Haber-Bosch process can be replaced with an efficient electrochemical process for ammonia production, where the hydrogen source is water.

Referring to FIG. 12, there is illustrated an ammonia production cell/device 120 including cathode 15, as described previously and including a porous material. Water oxidation is shown occurring at the anode 122, which may be a standard form of anode or anode 3, including a porous material, as previously described.

The water oxidation reaction can be used as a proton source for the reaction to electrochemically produce ammonia at cathode 15 under ambient conditions. Therefore, cell 120 overcomes problems relating to the Haber-Bosch process by reducing energy consumption required to produce $H_2$. Catalysts can be added to or associated with cathode 15 to improve or allow operation. This can facilitate the nitrogen reduction reaction under ambient conditions.

The general design of cell 120 can be used for other gas phase reactions, for example where a three-phase interface and an efficient electro-catalyst are required.

Referring to FIG. 13 there is illustrated an example fuel cell 130 having a cathode 15 and anode 3, either or both can include a gas permeable or porous material as previously described, and electrolyte 132. Two chemical reactions occur at the interfaces of the anode 3/electrolyte 132 and cathode 15/electrolyte 132. The net result of the two reactions is that fuel is consumed, and a variety of fuels can be used in fuel cell 130. Typically, water or carbon dioxide is produced and an electric current is created between anode 3 and cathode 15, which powers an electrical device 134.

At anode 3 a catalyst oxidizes the fuel, usually for example hydrogen, turning the fuel into a positively charged ion and an electron. The electrolyte 132 is a substance designed so that ions can pass through the electrolyte 132, but the electrons cannot. The electrons travel via a conducting pathway creating the electric current to electrical device 134. The ions travel through the electrolyte 132 to the cathode 15. At the cathode 15, the ions react with a third chemical, usually for example oxygen, to create water or carbon dioxide.

Various aspects of example embodiments, particularly in relation to these and other example applications, are described below.

In one example there is provided an electrolytic cell having at least one electrode comprising a porous material, wherein gas produced at the at least one electrode diffuses out of the cell via the porous material.

In another example, in operation the gas is produced at the at least one electrode without bubble formation or without substantial bubble formation.

In various examples: greater than 90% of the gas produced at the at least one electrode is removed from the cell across or through the porous material; greater than 95% of the gas produced at the at least one electrode is removed from the cell across or through the porous material; and/or greater than 99% of the gas produced at the at least one electrode is removed from the cell across or through the porous material. In another example the porous material is electrolyte impermeable.

In various other examples: the produced forms bubbles less than 125 μm in average diameter; the gas produced forms bubbles less than 100 μm in average diameter; and/or the gas produced forms bubbles less than 50 μm in average diameter.

In another example the at least one electrode is a cathode, and in operation the gas produced at the cathode diffuses out of the cell via the porous material, separating the gas from a cathodic reaction without substantial bubble formation.

In another example the at least one electrode is an anode, and in operation the gas produced at the anode diffuses out of the cell via the porous material, separating the gas from an anodic reaction without substantial bubble formation.

In various other examples, the porous material is at least partly hydrophobic, the porous material includes or has a thin-film coating applied, and/or the thin-film coating is hydrophobic.

In various other examples, the thin-film coating is selected from the group comprising silicone-fluoropolymer, polydimethylsiloxane (PDMS) or its copolymers with fluoromonomers, PDD-TFE (perfluoro-2,2-dimethyl-1,3-dioxole with tetrafluoroethylene), polyvinyl fluoride, polyvinyl chloride, nylon 8,8, nylon 9,9, polystyrene, polyvinylidene fluoride, poly n-butyl methacrylates, polytrifluoroethylene, nylon 10,10, polybutadiene, polyethylene polychlorotrifluoroethylene, polypropylene, polydimethylsiloxane, poly t-butyl methacrylates, fluorinated ethylene propylene, hexatriacontane, paraffin, polytetrafluoroethylene, poly (hexafluoropropylene), polyisobutylene or combinations thereof.

Preferably, the porous material has an average pore size of less than 0.5 μm; the porous material has an average pore size of less than 0.1 μm; and/or the porous material has an average pore size of less than 0.05 μm.

In another example, the electrolytic cell further includes a catalyst associated with the porous material.

In other various examples, the catalyst is selected from the group comprising Pt, Au, Pd, Ru, Ir, Mn, Fe, Ni, Co, $NiO_x$, Mn complexes, Fe complexes, $MoS_x$, CdS, CdSe, and GaAs or combinations thereof.

In various example applications, the electrolytic cell is for use in gas synthesis, the electrolytic cell is for use in a battery, the electrolytic cell is for use in a fuel cell, the electrolytic cell is for use in the production of nitrous oxide, or the electrolytic cell is for use in the production of ammonia.

In another example form, there is provided an electrolytic cell, comprising: a cathode comprising a first porous material; an anode comprising a second porous material; at least one electrolyte for at least partial immersion of the cathode and the anode; wherein in operation gases are produced at the cathode and the anode without substantial bubble formation and the gases diffuse out of the cell via the porous materials.

In another example form, there is provided a method of producing gas using an electrolytic cell, the method comprising the steps of: providing a cathode comprising a first porous material; providing an anode comprising a second porous material; at least partially immersing the cathode and the anode in at least one electrolyte; and passing a current through the anode and the cathode; wherein gas produced at the anode diffuses out of the cell via the second porous material, and wherein gas produced at the cathode diffuses out of the cell via the first porous material.

In another example form, there is provided a method of producing gas using an electrolytic cell, the method comprising: producing gas at an electrode; diffusing the gas out of the cell via a porous material of the electrode; and separating the gas produced without substantial bubble formation at the electrode.

In other examples, more than 90% of the gas is separated at the electrode by transporting the gas across the porous material adjacent or near a catalytic surface, and/or the gas is separated without formation of bubbles larger than 125 µm in average diameter.

Optional embodiments may also be said to broadly include the parts, elements, steps and/or features referred to or indicated herein, individually or in any combination of two or more of the parts, elements, steps and/or features, and where specific integers are mentioned which have known equivalents in the art to which the invention relates, such known equivalents are deemed to be incorporated herein as if individually set forth.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses, if any, are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. An electrolytic cell comprising a first electrode and a second electrode, wherein at least one of the first and second electrodes comprises a porous material, wherein gas produced at the at least one electrode diffuses out of the cell via the porous material, and wherein a spacing between the first and second electrodes is permeable to gases.

2. The electrolytic cell according to claim 1, wherein in operation the gas is produced at the at least one electrode without bubble formation or without substantial bubble formation.

3. The electrolytic cell according to claim 1, wherein greater than 90% of the gas produced at the at least one electrode is removed from the cell across or through the porous material.

4. The electrolytic cell according to claim 1, wherein greater than 95% of the gas produced at the at least one electrode is removed from the cell across or through the porous material.

5. The electrolytic cell according to claim 1, wherein greater than 99% of the gas produced at the at least one electrode is removed from the cell across or through the porous material.

6. The electrolytic cell according to claim 1, wherein the porous material is electrolyte impermeable.

7. The electrolytic cell according to claim 1, wherein the gas produced forms bubbles less than 125 µm in average diameter.

8. The electrolytic cell according to claim 1, wherein the gas produced forms bubbles less than 100 µm in average diameter.

9. The electrolytic cell according to claim 1, wherein the gas produced forms bubbles less than 50 µm in average diameter.

10. The electrolytic cell according to claim 1, wherein the at least one electrode is a cathode, and wherein in operation the gas produced at the cathode diffuses out of the cell via the porous material, separating the gas from a cathodic reaction without substantial bubble formation.

11. The electrolytic cell according to claim 1, wherein the at least one electrode is an anode, and wherein in operation the gas produced at the anode diffuses out of the cell via the porous material, separating the gas from an anodic reaction without substantial bubble formation.

12. The electrolytic cell according to claim 1, wherein the porous material is at least partly hydrophobic.

13. The electrolytic cell according to claim 1, wherein the porous material includes or has a thin-film coating applied.

14. The electrolytic cell according to claim 13, wherein the thin-film coating is hydrophobic.

15. The electrolytic cell according to claim 13, wherein the thin-film coating is selected from the group comprising silicone-fluoropolymer, polydimethylsiloxane (PDMS) or its copolymers with fluoromonomers, PDD-TFE (perfluoro-2, 2-dimethyl-1, 3-dioxole with tetrafluoroethylene), polyvinyl fluoride, polyvinyl chloride, nylon 8,8, nylon 9,9, polystyrene, polyvinylidene fluoride, poly n-butyl methacrylates, polytrifluoroethylene, nylon 10,10, polybutadiene, polyethylene polychlorotrifluoroethylene, polypropylene, polydimethylsiloxane, poly t-butyl methacrylates, fluorinated ethylene propylene, hexatriacontane, paraffin, polytetrafluoroethylene, poly(hexafluoropropylene), polyisobutylene or combinations thereof.

16. The electrolytic cell according to claim 12, wherein the porous material has an average pore size of less than 0.5 µm.

17. The electrolytic cell according to claim 12, wherein the porous material has an average pore size of less than 0.1 µm.

18. The electrolytic cell according to claim 12, wherein the porous material has an average pore size of less than 0.05 µm.

19. The electrolytic cell according to claim 1, which further includes a catalyst associated with the porous material.

20. The electrolytic cell according to claim 19, wherein the catalyst is selected from the group comprising Pt, Au, Pd, Ru, Ir, Mn, Fe, Ni, Co, $NiO_x$, Mn complexes, Fe complexes, $MoS_x$, CdS, CdSe, and GaAs or combinations thereof.

21. The electrolytic cell according to claim 1, for use in gas synthesis.

22. The electrolytic cell according to claim 1, for use in a battery.

23. The electrolytic cell according to claim 1, for use in a fuel cell.

24. The electrolytic cell according to claim 1, for use in the production of nitrous oxide.

25. The electrolytic cell according to claim 1, for use in the production of ammonia.

26. An electrolytic cell, comprising:
a cathode comprising a first porous material;
an anode comprising a second porous material; and,
at least one electrolyte for at least partial immersion of the cathode and the anode;
wherein in operation gases are produced at the cathode and the anode without substantial bubble formation and the gases diffuse out of the cell via the porous materials; and
wherein a spacing between the cathode and the anode is permeable to gases.

27. A method of producing gas using an electrolytic cell, the method comprising the steps of:
providing a cathode comprising a first porous material;
providing an anode comprising a second porous material;
at least partially immersing the cathode and the anode in at least one electrolyte; and
passing a current through the anode and the cathode;
wherein gas produced at the anode diffuses out of the cell via the second porous material, and wherein gas produced at the cathode diffuses out of the cell via the first porous material; and
wherein a spacing between the cathode and the anode is permeable to gases.

28. A method of producing gas using an electrolytic cell, the method comprising:
producing gas at an electrode;
diffusing the gas out of the cell via an electrolyte-impermeable porous material of the electrode; and
separating the gas produced without substantial bubble formation at the electrode.

29. The method according to claim 28, wherein more than 90% of the gas is separated at the electrode by transporting the gas across the porous material adjacent or near a catalytic surface.

30. The method according to claim 28, wherein the gas is separated without formation of bubbles larger than 125 μm in average diameter.

31. An electrolytic cell having at least one electrode comprising an electrolyte-impermeable porous material, wherein gas produced at the at least one electrode diffuses out of the cell via the porous material, and wherein the electrolytic cell does not comprise a separator.

* * * * *

UNITED STATES PATENT AND TRADEMARK OFFICE
CERTIFICATE OF CORRECTION

PATENT NO. : 9,938,627 B2
APPLICATION NO. : 14/407014
DATED : April 10, 2018
INVENTOR(S) : Winther-Jensen et al.

Page 1 of 1

It is certified that error appears in the above-identified patent and that said Letters Patent is hereby corrected as shown below:

In the Specification

Column 7, Line 58, change "bather" to -- barrier --.

Column 22, Line 13, after "the" insert -- gas --.

Signed and Sealed this
Tenth Day of July, 2018

Andrei Iancu
*Director of the United States Patent and Trademark Office*